(12) United States Patent
Bridges et al.

(10) Patent No.: US 9,684,055 B2
(45) Date of Patent: *Jun. 20, 2017

(54) METHOD AND APPARATUS FOR USING GESTURES TO CONTROL A LASER TRACKER

(71) Applicant: FARO Technologies, Inc., Lake Mary, FL (US)

(72) Inventors: Robert E. Bridges, Kennett Square, PA (US); David H. Parker, Earlysville, VA (US); Kelley Fletcher, Costa Mesa, CA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,786

(22) Filed: Dec. 12, 2016

(65) Prior Publication Data

US 2017/0090005 A1 Mar. 30, 2017

Related U.S. Application Data

(60) Continuation of application No. 15/165,068, filed on May 26, 2016, now Pat. No. 9,618,602, which is a
(Continued)

(51) Int. Cl.
*G01S 3/786* (2006.01)
*G01B 11/00* (2006.01)
(Continued)

(52) U.S. Cl.
CPC ............ *G01S 3/786* (2013.01); *G01B 11/002* (2013.01); *G01S 17/66* (2013.01); *G06F 3/017* (2013.01);
(Continued)

(58) Field of Classification Search
CPC ..... G01B 11/002; G01B 11/14; G01B 11/005; G01B 11/26; G06F 3/017; H01N 13/0221
See application file for complete search history.

(56) References Cited

U.S. PATENT DOCUMENTS

| 4,714,339 A | 12/1987 | Lau et al. |
| 4,790,651 A | 12/1988 | Brown et al. |

(Continued)

FOREIGN PATENT DOCUMENTS

| WO | 2007079601 A1 | 7/2007 |
| WO | 2011070313 A1 | 6/2011 |
| WO | 2013167472 A1 | 11/2013 |

OTHER PUBLICATIONS

Geng, Jason. "DLP-based structured light 3D imaging technologies and applications." SPIE MOEMS-MEMS. International Society for Optics and Photonics, 2011. 15 Pages.
(Continued)

*Primary Examiner* — Sang Nguyen
(74) *Attorney, Agent, or Firm* — Cantor Colburn LLP

(57) ABSTRACT

A method and system are provided for controlling a measurement device remotely through gestures performed by a user. The method includes providing a relationship between each of a plurality of commands and each of a plurality of user gestures. A gesture is performed by the user with the user's body that corresponds to one of the plurality of user gestures. The gesture performed by the user is detected. A first command is determined from one of the plurality of commands based at least in part on the detected gesture. Then the first command is executed with the laser tracker.

19 Claims, 18 Drawing Sheets

Related U.S. Application Data continuation of application No. 14/803,575, filed on Jul. 20, 2015, now Pat. No. 9,383,189, which is a division of application No. 14/264,420, filed on Apr. 29, 2014, now Pat. No. 9,234,742.

(60) Provisional application No. 61/818,208, filed on May 1, 2013.

(51) Int. Cl.

| | | |
|---|---|---|
| *G06T 7/00* | (2017.01) | |
| *G06K 9/00* | (2006.01) | |
| *G06F 3/01* | (2006.01) | |
| *G01S 17/66* | (2006.01) | |
| *G06T 7/254* | (2017.01) | |
| *G06T 7/194* | (2017.01) | |

(52) U.S. Cl.
CPC .......... *G06K 9/00355* (2013.01); *G06T 7/194* (2017.01); *G06T 7/254* (2017.01); *G06T 2207/10016* (2013.01); *G06T 2207/20224* (2013.01); *G06T 2207/30196* (2013.01)

(56) References Cited

U.S. PATENT DOCUMENTS

| | | |
|---|---|---|
| 5,121,242 A | 6/1992 | Kennedy |
| 5,313,409 A | 5/1994 | Wiklund et al. |
| 5,858,057 A | 1/1999 | Celada-Gonzalez et al. |
| 5,973,788 A | 10/1999 | Pettersen et al. |
| 6,023,326 A | 2/2000 | Katayama et al. |
| 6,034,722 A | 3/2000 | Viney et al. |
| 6,069,700 A | 5/2000 | Rudnick et al. |
| 6,133,998 A | 10/2000 | Monz et al. |
| 6,134,507 A | 10/2000 | Markey, Jr. et al. |
| 6,166,809 A | 12/2000 | Pettersen et al. |
| 6,295,174 B1 | 9/2001 | Ishinabe et al. |
| 6,462,810 B1 | 10/2002 | Muraoka et al. |
| 6,587,244 B1 | 7/2003 | Ishinabe et al. |
| 6,847,336 B1 | 1/2005 | Lemelson |
| 7,022,971 B2 | 4/2006 | Ura et al. |
| 7,055,253 B2 | 6/2006 | Kaneko |
| 7,230,689 B2 | 6/2007 | Lau |
| 7,233,316 B2 | 6/2007 | Smith et al. |
| 7,304,729 B2 | 12/2007 | Yasutomi et al. |
| 7,307,710 B2 | 12/2007 | Gatsios et al. |
| 7,327,446 B2 | 2/2008 | Cramer et al. |
| 7,423,742 B2 | 9/2008 | Gatsios et al. |
| 7,541,965 B2 | 6/2009 | Ouchi et al. |
| 7,552,539 B2 | 6/2009 | Piekutowski |
| 7,800,758 B1 | 9/2010 | Bridges et al. |
| 7,804,602 B2 | 9/2010 | Raab |
| 8,170,656 B2 | 5/2012 | Tan et al. |
| 8,618,405 B2 | 12/2013 | Tansley |
| 9,234,742 B2 * | 1/2016 | Bridges ................ G01B 11/002 |
| 9,360,301 B2 * | 6/2016 | Bridges ................ G01B 11/002 |
| 2003/0179362 A1 | 9/2003 | Osawa et al. |
| 2008/0004904 A1 | 1/2008 | Tran |
| 2008/0013793 A1 * | 1/2008 | Hillis ................... G03H 1/0005 382/114 |
| 2008/0013826 A1 * | 1/2008 | Hillis ...................... G06F 3/017 382/154 |
| 2008/0229592 A1 | 9/2008 | Hinderling et al. |
| 2009/0017618 A1 | 1/2009 | Lee et al. |
| 2009/0327171 A1 * | 12/2009 | Tan ......................... G06F 3/015 706/12 |
| 2010/0128259 A1 | 5/2010 | Bridges et al. |
| 2010/0160714 A1 | 6/2010 | Chua et al. |
| 2010/0210924 A1 | 8/2010 | Parthasarathy et al. |
| 2011/0035952 A1 | 2/2011 | Roithmeier |
| 2011/0052007 A1 * | 3/2011 | Chen ..................... G06F 3/0416 382/103 |
| 2011/0154266 A1 | 6/2011 | Friend |
| 2011/0260033 A1 * | 10/2011 | Steffensen ........... G01C 15/002 250/203.1 |
| 2012/0051588 A1 * | 3/2012 | McEldowney ........ G03B 17/54 382/103 |
| 2012/0057174 A1 | 3/2012 | Briggs |
| 2012/0120415 A1 | 5/2012 | Steffensen et al. |
| 2012/0188158 A1 | 7/2012 | Tan et al. |
| 2012/0236288 A1 | 9/2012 | Stanley |
| 2012/0236320 A1 | 9/2012 | Steffey et al. |
| 2012/0262550 A1 | 10/2012 | Bridges |
| 2012/0265479 A1 | 10/2012 | Bridges |
| 2013/0060480 A1 | 3/2013 | Korhonen et al. |
| 2013/0335531 A1 | 12/2013 | Lee et al. |
| 2014/0028805 A1 | 1/2014 | Tohme |
| 2014/0240103 A1 | 8/2014 | Lake et al. |

OTHER PUBLICATIONS

Hussein, Mohamed, et al. "Real-time human detection, tracking, and verification in uncontrolled camera motion environments." Fourth IEEE International Conference on Computer Vision Systems (ICVS'06). IEEE, 2006. 7 pages.

International Search Report and the Written opinion for application No. PCT/US2014/035997 dated Dec. 3, 2014; 17 pages.

Ko, Dong-Ik, and Gaurav Agarwal. "Gesture recognition—First step toward 3D UIs?." Embedded Systems Design (2011): 24. 6 pages.

* cited by examiner

| Command | Software shortcut | Example 1 gesture | Example 2 gesture |
|---|---|---|---|
| Cancel | Esc | | |
| Measure a Comp Off Point | F2 | | |
| Measure a Comp Axis Point | I | | |
| Measure a Plane | F3 | | |
| Measure a 2D Line | F4 | | |
| Measure a Circle | F10 | | |
| Measure a Cylinder | F8 | | |
| Measure a Sphere | F12 | | |
| Change SMR | P | | |
| Reset Interferometer | T | | |

FIG. 7

| Command | Software shortcut | Example 1 gesture | Example 2 gesture |
|---|---|---|---|
| Set Distance Mode | N |  |  |
| Search | S |  |  |
| Toggle Single Point/ Scan Modes | X |  |  |
| Material Thickness | M |  |  |
| Collect Reading | Insert |  |  |
| Compensation Point | Home |  |  |
| Remove Reading | ← |  |  |
| Autoadjust Using SMR | N/A |  |  |
| Autoadjust Using Internal Retroreflector | N/A |  |  |
| Initialize Command Tablet | N/A |  |  |
FIG. 8

| Command | Software shortcut | Example 1 gesture | Example 2 gesture |
|---|---|---|---|
| Set Reference Point | N/A | (square, arrow right-top) | (fist) |
| User Defined 1 | N/A | (square, arrow down-right) | (1 finger up) |
| User Defined 2 | N/A | (square, arrow left-bottom) | (2 fingers up) |
| User Defined 3 | N/A | (square, arrow left-top) | (3 fingers up) |
| User Defined 4 | N/A | (square, arrow up-right) | (4 fingers up) |
| User Defined 5 | N/A | (square, arrow right-bottom) | (5 fingers/open hand) |
| User Defined 6 | N/A | (square, arrow down-left) | (open hand) |
| Acquire SMR | N/A | (square, arrow up-left) | (thumb out) |

128 — Command
130 — Software shortcut
124 — Example 1 gesture
126 — Example 2 gesture

FIG. 9

METHOD AND APPARATUS FOR USING GESTURES TO CONTROL A LASER TRACKER

CROSS REFERENCE TO RELATED APPLICATIONS

The present application is a continuation application of U.S. application Ser. No. 15/165,068 entitled "Method and Apparatus for Using Gestures to Control a Laser Tracker" filed on May 26, 2016, which is a continuation of U.S. application Ser. No. 14/803,575 entitled "Method and Apparatus for Using Gestures to Control a Laser Tracker" filed on Jul. 20, 2015, which is a divisional application of U.S. application Ser. No. 14/264,420 entitled "Method and Apparatus for Using Gestures to Control a Laser Tracker" now U.S. Pat. No. 9,234,742. U.S. application Ser. No. 14/264,420 is a Nonprovisional Application of U.S. Provisional Application Ser. No. 61/818,208 filed on May 1, 2013 entitled "Method and Apparatus for Using Gestures to Control a Laser Tracker," the contents of both of which are incorporated by reference herein.

BACKGROUND OF THE INVENTION

The present disclosure relates to a coordinate measuring device. One set of coordinate measurement devices belongs to a class of instruments that measure the three-dimensional (3D) coordinates of a point by sending a laser beam to the point, where it is intercepted by a retroreflector target. The instrument finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. An example of such a device is a laser tracker. Exemplary laser tracker systems are described by U.S. Pat. No. 4,790,651 to Brown et al., the contents of which is incorporated by reference herein, and U.S. Pat. No. 4,714,339 to Lau et al.

A coordinate-measuring device closely related to the laser tracker is the total station. The total station, which is most often used in surveying applications, may be used to measure the coordinates of diffusely scattering or retroreflective targets. Hereinafter, the term laser tracker is used in a broad sense to include total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface being measured. Because of this placement of the cube corner within the sphere, the perpendicular distance from the apex of the cube corner to the surface of the object under test remains constant despite rotation of the SMR. Consequently, the 3D coordinates of a surface can be found by having a tracker follow the 3D coordinates of an SMR moved over the surface. It is possible to place a glass window on the top of the SMR to prevent dust or dirt from contaminating the glass surfaces.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

As mentioned previously, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer. Such an ADM is described in U.S. Pat. No. 7,352,446 to Bridges et al., the contents of which is incorporated by reference herein.

In its tracking mode, the laser tracker will automatically follow movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. By default, following the beam break, the beam remains fixed at the point of the beam break or at the last commanded position. The operator may visually search for the tracking beam and place the SMR in the beam in order to lock the instrument onto the SMR and continue tracking.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each in an automated sequence. Exemplary systems are described in U.S. Pat. No. 6,166,809 to Pettersen et al., and U.S. Pat. No. 7,800,758 to Bridges et al., the contents of which are incorporated by reference herein.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom. Exemplary systems are described in U.S. Published Patent Application No. 2010/0128259 to Bridges, the contents of which is incorporated by reference herein; U.S. Pat. No. 7,800,758 to Bridges et al., U.S. Pat. No. 5,973,788 to Pettersen et al.; and U.S. Pat. No. 7,230,689 to Lau.

Two common modes of operation of the laser tracker are tracking mode and profiling mode. In tracking mode, the laser beam from the tracker follows the retroreflector as the operator moves it around. In profiling mode, the laser beam from the tracker goes in the direction given by the operator, either through computer commands or manual action.

Besides these modes of operation that control the basic tracking and pointing behavior of the tracker, there are also other option modes that enable the tracker to respond in a manner selected by the operator ahead of time. The desired option mode is typically selected in software that controls the laser tracker. Such software may reside in an external computer attached to the tracker (possibly through a network cable) or within the tracker itself. In the latter case, the software may be accessed through console functionality built into the tracker.

An example of an option mode is the Auto Reset mode in which the laser beam is driven to a preset reference point whenever the laser beam is broken. One popular reference point for the Auto Reset option mode is the tracker Home Position, which is the position of a magnetic nest mounted on the tracker body. The alternative to Auto Reset is the No Reset option mode. In this case, the laser beam continues pointing in the original direction whenever the laser beam is broken. A description of the tracker home position is given in U.S. Pat. No. 7,327,446 to Cramer et al., the contents of which is incorporated by reference herein.

Another example of an option mode is sometimes referred to as "PowerLock". In the PowerLock option mode, the location of the retroreflector is found by a tracker camera whenever the tracker laser beam is broken. The camera immediately sends the angular coordinates of the retroreflector to the tracker control system, thereby causing the tracker to point the laser beam back at the retroreflector. Methods involving automatic acquisition of a retroreflector are given in international application WO 2007/079601 to Dold et al. and U.S. Pat. No. 7,055,253 to Kaneko.

Some option modes are slightly more complex in their operation. An example is the Stability Criterion mode, which may be invoked whenever an SMR is stationary for a given period of time. The operator may track an SMR to a magnetic nest and set it down. If a stability criterion is active, the software will begin to look at the stability of the three-dimensional coordinate readings of the tracker. For instance, the user may decide to judge the SMR to be stable if the peak-to-peak deviation in the distance reading of the SMR is less than two micrometers over a one second interval. After the stability criterion is satisfied, the tracker measures the 3D coordinates and the software records the data.

More complex modes of operation are possible through computer programs. For example, software is available to measure part surfaces and fit these to geometrical shapes. Software will instruct the operator to move the SMR over the surface and then, when finished collecting data points, to raise the SMR off the surface of the object to end the measurement. Moving the SMR off the surface not only indicates that the measurement is completed; it also indicates the position of the SMR in relation to the object surface. This position information is needed by the application software to account for the offset caused by the SMR radius.

A second example of computer control is a tracker survey. In the survey, the tracker is driven sequentially to each of several target locations according to a prearranged schedule. The operator may teach these positions prior to the survey by carrying the SMR to each of the desired positions.

A third example of software control is tracker directed measurement. The software directs the operator to move the SMR to a desired location. It does this using a graphic display to show the direction and distance to the desired location. When the operator is at the desired position, the color on the computer monitor might, for example, turn from red to green.

The element common to the tracker actions described above is that the operator is limited in his ability to control the behavior of the tracker. On the one hand, option modes selected in the software may enable the operator to preset certain behaviors of the tracker. However, once the option modes have been selected by the user, the behavior of the tracker is established and cannot be changed unless the operator returns to the computer console. On the other hand, the computer program may direct the operator to carry out complicated operations that the software analyzes in a sophisticated way. In either case, the operator is limited in his ability to control the tracker and the data collected by the tracker.

A laser tracker operator performs two different functions. The operator positions an SMR during a measurement, and sends commands through the control computer to the tracker. However, it is not easy for a single operator to perform both of these measurement functions because the computer is usually remotely located from the measurement location. Various methods have been tried to get around this limitation, but none is completely satisfactory.

One method sometimes used is for a single operator to set the retroreflector in place and walk back to the instrument control keyboard to execute a measurement instruction. However, this is an inefficient use of operator and instrument time. In cases where the operator must hold the retroreflector for the measurement, single operator control is only possible when the operator is very close to the keyboard.

A second method is to add a second operator. One operator stands by the computer and a second operator moves the SMR. This is labor intensive and an expensive method. Further, verbal communication over large distances can be a problem.

A third method is to equip a laser tracker with a remote control. However, remote controls have several limitations. Many facilities do not allow the use of remote controls for safety or security reasons. Even if remote controls are allowed, interference among wireless channels may be an issue. Some remote control signals do not reach the full range of the laser tracker. In some situations, such as working from a ladder, the second hand may not be free to operate the remote control. Before a remote control can be used, it is usually necessary to set up the computer and remote control to work together, and then only a small subset of tracker commands can ordinarily be accessed at any given time. An example of a system based on this idea is given in U.S. Pat. No. 7,233,316 to Smith et al.

A fourth method is to interface a cell phone to a laser tracker. Commands are entered remotely by calling the instrument from the cell phone and entering numbers from the cell phone keypad or by means of voice recognition. This method also has many shortcomings. Some facilities do not allow cell phones to be used, and cell phones may not be available in rural areas. Service requires a monthly service provider fee. A cell phone interface requires additional hardware interfacing to the computer or laser tracker. Cell phone technology changes fast and may require upgrades. As in the case of remote controls, the computer and remote control must be set up to work together, and only a small subset of tracker commands can ordinarily be accessed at a given time.

A fifth method is to equip a laser tracker with internet or wireless network capabilities and use a wireless portable computer or personal digital assistant (PDA) to communicate commands to the laser tracker. However, this method has limitations similar to a cell phone. This method is often used with total stations. Examples of systems that use this method include U.S. Published Patent Application No. 2009/0017618 to Kumagai et al., U.S. Pat. No. 6,034,722 to Viney et al., U.S. Pat. No. 7,423,742 to Gatsios et al., U.S. Pat. No. 7,307,710 to Gatsios et al., U.S. Pat. No. 7,552,539 to Piekutowski, and U.S. Pat. No. 6,133,998 to Monz et al. This method has also been used to control appliances by a method described in U.S. Pat. No. 7,541,965 to Ouchi et al.

A sixth method is to use a pointer to indicate a particular location in which a measurement is to be made. An example of this method is given in U.S. Pat. No. 7,022,971 to Ura et al. It might be possible to adapt this method to give commands to a laser tracker, but it is not usually very easy to find a suitable surface upon which to project the pointer beam pattern.

A seventh method is to devise a complex target structure containing at least a retroreflector, transmitter, and receiver. Such systems may be used with total stations to transmit precise target information to the operator and also to transmit global positioning system (GPS) information to the total station. An example of such a system is given in U.S. Published Patent Application No. 2008/0229592 to Hinderling et al. In this case, no method is provided to enable the operator to send commands to the measurement device (total station).

An eighth method is to devise a complex target structure containing at least a retroreflector, transmitter and receiver, where the transmitter has the ability to send modulated light signals to a total station. A keypad can be used to send commands to the total station by means of the modulated light. These commands are decoded by the total station. Examples of such systems are given in U.S. Pat. No. 6,023,326 to Katayama et al., U.S. Pat. No. 6,462,810 to Muraoka et al., U.S. Pat. No. 6,295,174 to Ishinabe et al., and U.S. Pat. No. 6,587,244 to Ishinabe et al. This method is particularly appropriate for surveying applications in which the complex target and keypad are mounted on a large staff. Such a method is not suitable for use with a laser tracker, where it is advantageous to use a small target not tethered to a large control pad. Also it is desirable to have the ability to send commands even when the tracker is not locked onto a retroreflector target.

A ninth method is to include both a wireless transmitter and a modulated light source on the target to send information to a total station. The wireless transmitter primarily sends information on the angular pose of the target so that the total station can turn in the proper direction to send its laser beam to the target retroreflector. The modulated light source is placed near the retroreflector so that it will be picked up by the detector in the total station. In this way, the operator can be assured that the total station is pointed in the right direction, thereby avoiding false reflections that do not come from the target retroreflector. An exemplary system based on this approach is given in U.S. Pat. No. 5,313,409 to Wiklund et al. However, this method does not offer the ability to send general purpose commands to a laser tracker.

A tenth method is to include a combination of wireless transmitter, compass assembly in both target and total station, and guide light transmitter. The compass assembly in the target and total station are used to enable alignment of the azimuth angle of the total station to the target. The guide light transmitter is a horizontal fan of light that the target can pan in the vertical direction until a signal is received on the detector within the total station. Once the guide light has been centered on the detector, the total station adjusts its orientation slightly to maximize the retroreflected signal. The wireless transmitter communicates information entered by the operator on a keypad located at the target. An exemplary system based on this method is given in U.S. Pat. No. 7,304,729 to Wasutomi et al. However, this method does not offer the ability to send general purpose commands to a laser tracker.

An eleventh method is to modify the retroreflector to enable temporal modulation to be imposed on the retroreflected light, thereby transmitting data. The inventive retroreflector comprises a cube corner having a truncated apex, an optical switch attached to the front face of the cube corner, and electronics to transmit or receive data. An exemplary system of this type is given in U.S. Pat. No. 5,121,242 to Kennedy. This type of retroreflector is complex and expensive. It degrades the quality of the retroreflected light because of the switch (which might be a ferro-electric light crystal material) and because of the truncated apex. Also, the light returned to a laser tracker is already modulated for use in measuring the ADM beam, and switching the light on and off would be a problem, not only for the ADM, but also for the tracker interferometer and position detector.

A twelfth method is to use a measuring device that contains bidirectional transmitter for communicating with a target and an active retroreflector to assist in identifying the retroreflector. The bidirectional transmitter may be wireless or optical and is part of a complex target staff that includes the retroreflector, transmitter, and control unit. An exemplary system of this type is described in U.S. Pat. No. 5,828,057 to Hertzman et al. Such a method is not suitable for use with a laser tracker, where it is advantageous to use a small target not tethered to a large control pad. Also the method of identifying the retroreflector target of interest is complicated and expensive.

Accordingly, while existing laser trackers are suitable for their intended purposes the need for improvement remains. In particular there is a need for a simple method for an operator to communicate commands to a laser tracker from a distance.

SUMMARY OF THE INVENTION

In accordance with an embodiment of the invention, a method is provided for a user to control operation of a measurement device. The method includes providing a relationship between each of a plurality of commands and each of a plurality of gestures, each gesture of the plurality of gestures corresponding to a body position of the user. The measurement device is provided that measures three-dimensional coordinates of a point based at least in part on light from a first light projected from a first light source of the measurement device. A second light beam is projected from a second light source and acquiring a first image of a user. A skeletal model of the user is generated from the first image. The user is positioned into a first body position, the first body position corresponding to a first gesture from among the plurality of gestures. The skeletal model identifies the performing by the user of the first gesture. A first command is determined based at least in part on the identifying of the first gesture. The first command is executed with the measurement device. The user is positioned into a second body position, the second body position corresponding to a second gesture corresponding to a second body position. The skeletal model is used to identify the performing by the user of the second gesture. The second command is determined based at least in part on identifying the second gesture. The second command is executed with the measurement device.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1, including

FIGS. 7-9 show a selection of laser tracker commands and corresponding gestures that may be used by the operator to convey these commands to the laser tracker;

Figure 1A:
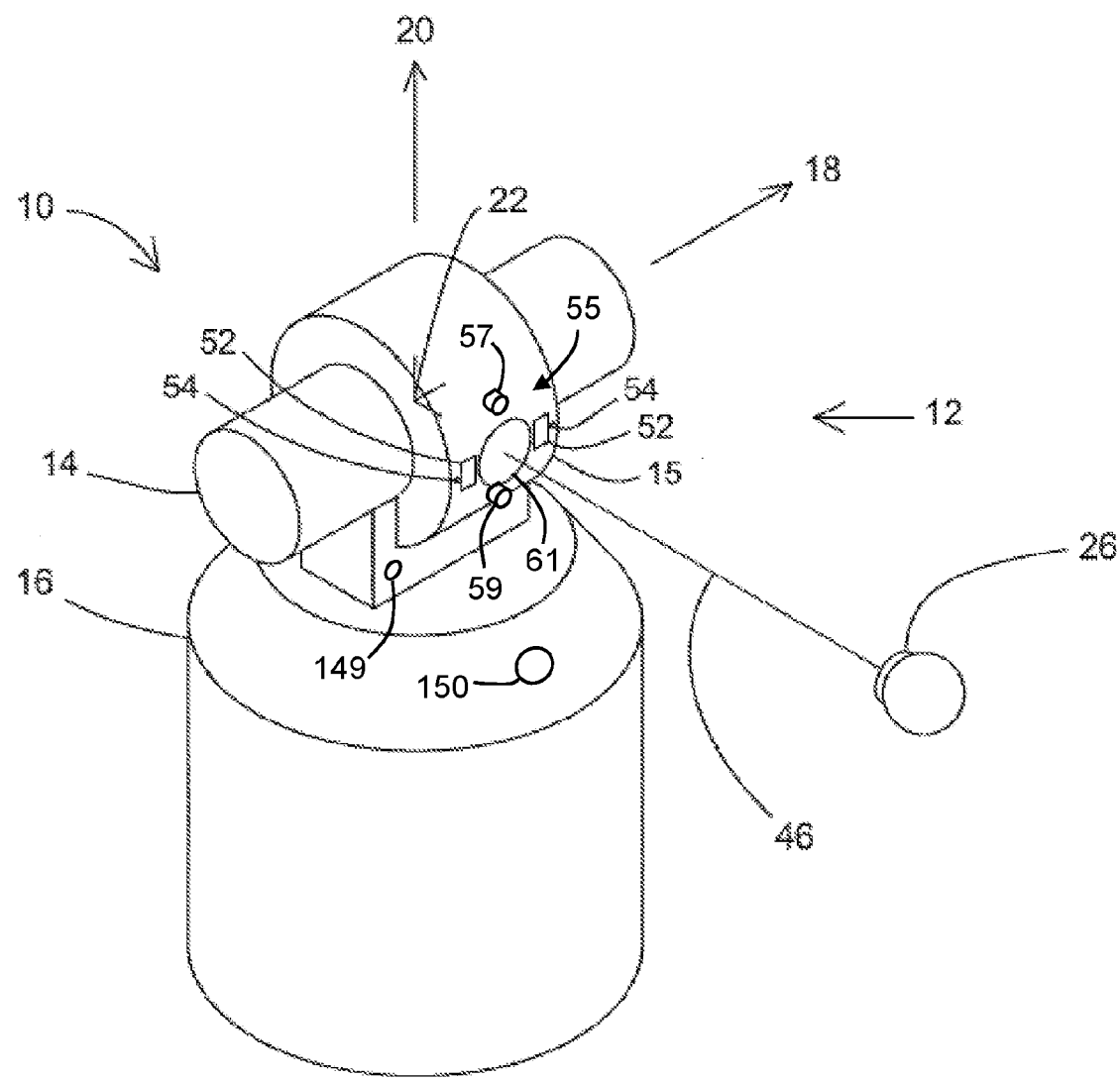
FIGS. 1A-1C show perspective views of exemplary laser trackers.

The detailed description explains embodiments of the invention, together with advantages and features, by way of example with reference to the drawings.

DETAILED DESCRIPTION OF THE EMBODIMENTS

An exemplary laser tracker 10 is illustrated in FIG. 1. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in the plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are coupled to zenith mechanical axis 18 and azimuth mechanical axis 20 and indicate, to high accuracy, the angles of rotation. Laser beam 46 travels to external retroreflector 26 such as a spherically mounted retroreflector (SMR) 26. By measuring the radial distance between gimbal point 22 and retroreflector 26 and the rotation angles about the zenith and azimuth axes 18, 20, the position of retroreflector 26 is found within the spherical coordinate system of the tracker 10.

Laser beam 46 may comprise one or more laser wavelengths. For clarity and simplicity, a steering mechanism of the sort shown in FIG. 1 is assumed in the following discussion and the claimed invention should not be so limited. In other embodiments different types of steering mechanisms are possible. For example, it would be possible to reflect a laser beam off a mirror rotated about the azimuth and zenith axes. An example of the use of a mirror in this way is given in U.S. Pat. No. 4,714,339 to Lau et al. The techniques described here are applicable, regardless of the type of steering mechanism.

In exemplary laser tracker 10, cameras 52 and light sources 54 are located on payload 15. Light sources 54 illuminate one or more retroreflector targets 26. Light sources 54 may be LEDs electrically driven to repetitively emit pulsed light. Each camera 52 comprises a photosensitive array and a lens placed in front of the photosensitive array. The photosensitive array may be a CMOS or CCD array. The lens may have a relatively wide field of view, say thirty or forty degrees. The purpose of the lens is to form an image on the photosensitive array of objects within the field of view of the lens. Each light source 54 is placed near camera 52 so that light from light source 54 is reflected off each retroreflector target 26 onto camera 52. In this way, retroreflector images are readily distinguished from the background on the photosensitive array as their image spots are brighter than background objects and are pulsed. There may be two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of the SMR can be monitored as the SMR is moved from point to point. A use of two cameras for this purpose is described in commonly owned U.S. Published Patent Application No. 2010/0128259 to Bridges which is incorporated by reference herein.

Other arrangements of one or more cameras and light sources are possible. For example, a light source and camera can be coaxial or nearly coaxial with the laser beams emitted by the tracker. In this case, it may be necessary to use optical filtering or similar methods to avoid saturating the photosensitive array of the camera with the laser beam from the tracker.

Another possible arrangement is to use a single camera located on the payload or base of the tracker. A single camera, if located off the optical axis of the laser tracker, provides information about the two angles that define the direction to the retroreflector but not the distance to the retroreflector. In many cases, this information may be sufficient. If the 3D coordinates of the retroreflector are needed when using a single camera, one possibility is to rotate the tracker in the azimuth direction by 180 degrees and then to flip the zenith axis to point back at the retroreflector. In this way, the target can be viewed from two different directions and the 3D position of the retroreflector can be found using triangulation.

A more general approach to finding the distance to a retroreflector with a single camera is to rotate the laser tracker about either the azimuth axis or the zenith axis and observe the retroreflector with a camera located on the tracker for each of the two angles of rotation. The retroreflector may be illuminated, for example, by an LED located close to the camera. Another possibility is to switch between measuring and imaging of the target. An example of such a method is described in U.S. Pat. No. 7,800,758 to Bridges et al. Other camera arrangements are possible and can be used with the methods described herein.

In the exemplary embodiment, the laser tracker 10 further includes a gesture capture device 55. The gesture capture device 55 includes a projector 57 and at least one camera 59. In one embodiment, the gesture capture device 55 is disposed within the payload 15 as shown in FIG. 1A. It should be appreciated that the projector 57 and camera 59 may be disposed adjacent the output aperture 61, such as adjacent the light sources 54 for example. One advantage of placing the projector 57 and camera 59 on the payload 15 is improved spatial resolution since it is possible to use a camera having a narrow field of view (FOV) in combination with a payload 15 that can be rotated over a wide range of accurately measured angles.

Figure 1B:
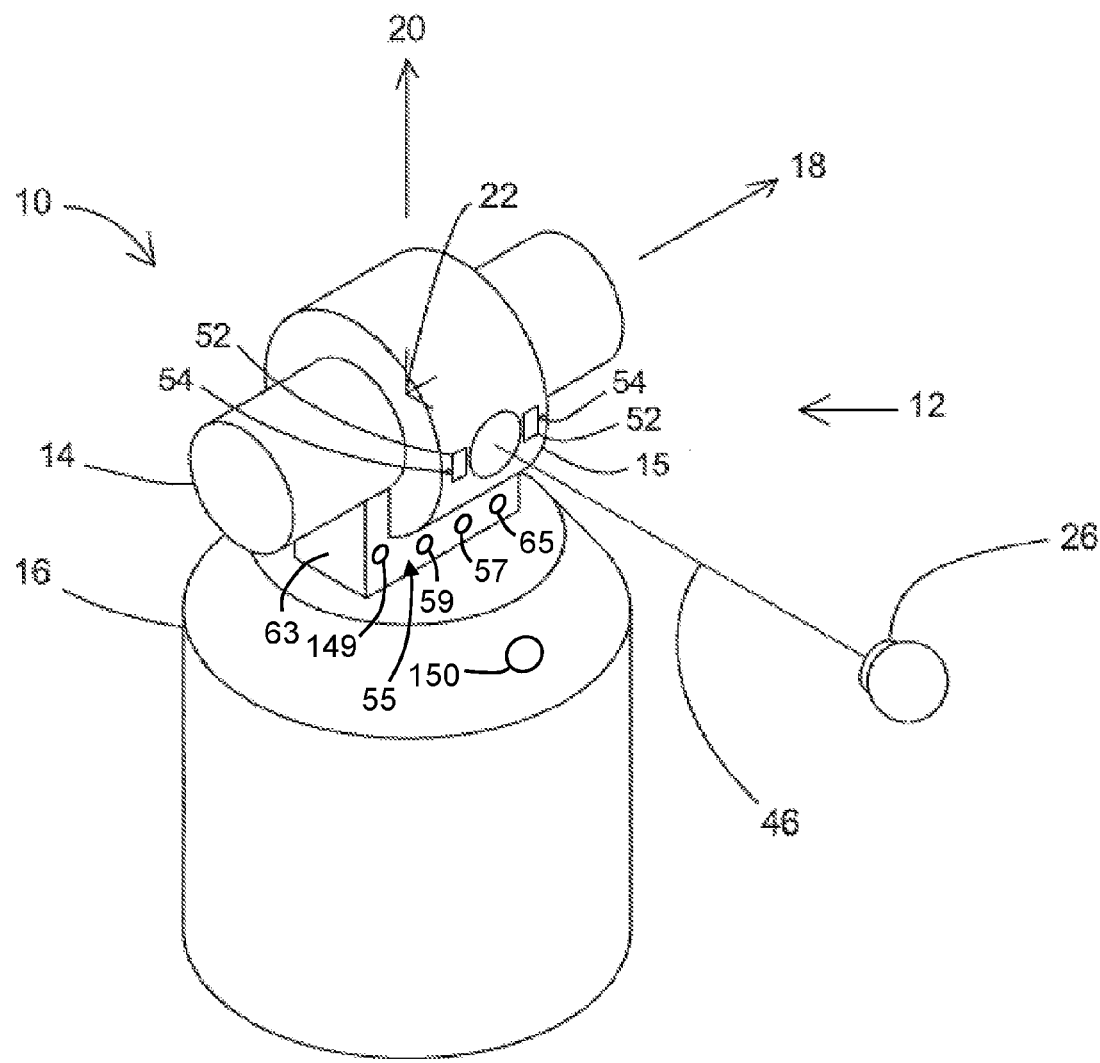

In another embodiment shown in FIG. 1B, the gesture capture device 55 is disposed within a housing 63. In this case, the gesture capture device 55 rotates about the azimuth axis 20 but remains at a fixed location relative to the zenith axis 18. In an embodiment, the gesture capture device 55 includes a second camera 65. In an embodiment, the projector 57 may be an infrared projector, the first camera 59 an infrared camera, and the second camera 65 an RGB camera (capable of capturing red, green, and blue colors).

Figure 1C:
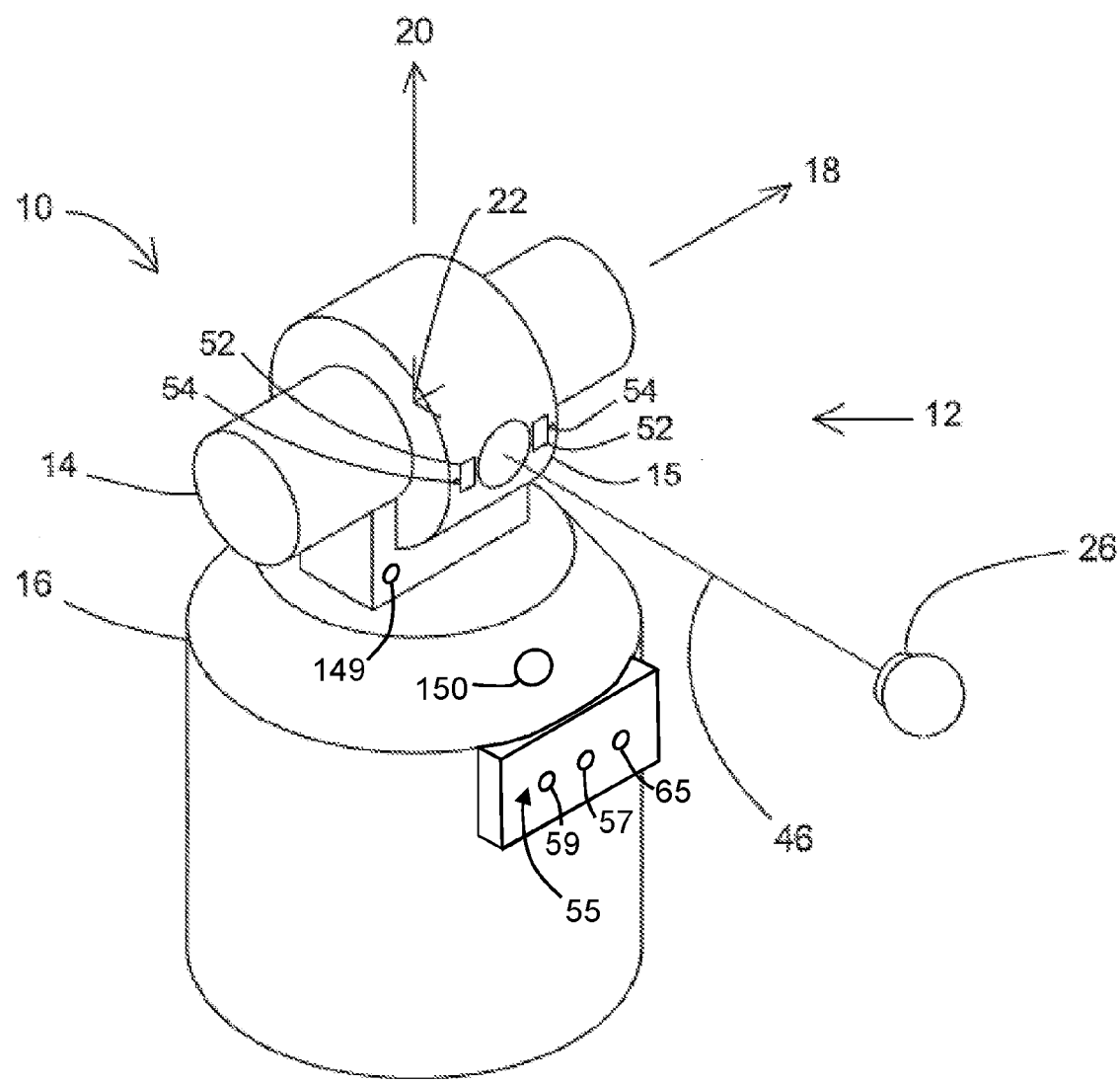

Still another embodiment is shown in FIG. 1C where the gesture capture device 55 is coupled to the base 16. In this embodiment, the gesture capture device 55 is fixed relative to both the azimuth axis 20 and the zenith axis 18.

Although FIGS. 1A, 1B, and 1C show the gesture capture device affixed to the tracker, it should be understood that a separate gesture capture device may be detached from the tracker and used to capture gestures. Such a separate gesture device may provide received information to internal processors with the laser tracker 10 or to an external computer, such as computer 80 shown in FIG. 2.

The gesture capture device 55 measures coordinates in three dimensions. In the exemplary embodiment, the gesture capture device 55 is a structured light scanner. A structured light scanner is configured to emit a structured light over an area, such as the area occupied by the operator. As used herein, the term "structured light" refers to a two-dimensional pattern of light projected onto an area of an object that conveys information which may be used to determine coordinates of points in the field of view, such as the operator for example. The structured light pattern is not limited to a easily defined pattern but may include more complex patterns such as speckle patterns, for example. As will be discussed in more detail herein, the gesture capture device 55 measures one or more three-dimensional coordinates to determine if the operator is performing a gesture corresponding to a command. The gesture may be in the form of a body position, such as a movement of a hand for example, or a body position, such as the arrangement of a hand for example.

In general, there are two types of structured light patterns, a coded light pattern and an uncoded light pattern. As used herein a coded light pattern is one in which the three dimensional coordinates of an illuminated surface of the object are found by acquiring a single image. With a coded light pattern, it is possible to obtain and register point cloud data while the projecting device is moving relative to the object. One type of coded light pattern contains a set of elements (e.g. geometric shapes) arranged in lines where at least three of the elements are non-collinear. Such pattern elements are recognizable because of their arrangement. Another type of coded light pattern is nearly random in its appearance and may be evaluated through the use of correlation methods, for example.

In contrast, an uncoded structured light pattern as used herein is a pattern that does not allow measurement through a single pattern. A series of uncoded light patterns may be projected and imaged sequentially. For this case, it is usually necessary during the measurement to hold the projector substantially fixed relative to the object.

It should be appreciated that the scanner 20 may use either coded or uncoded structured light patterns. The structured light pattern may include the patterns disclosed in the journal article "DLP-Based Structured Light 3D Imaging Technologies and Applications" by Jason Geng published in the Proceedings of SPIE, Vol. 7932, which is incorporated herein by reference.

Figure 2:
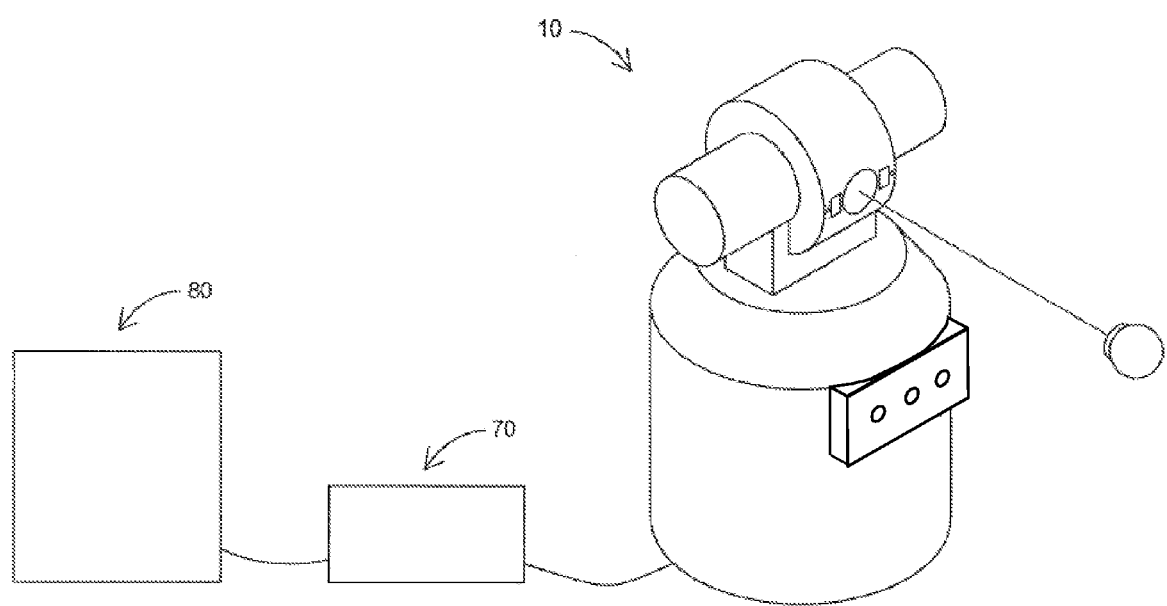
FIG. 2 shows computing and power supply elements attached to the laser tracker of FIG. 1.

Referring now to FIG. 2, an embodiment is shown of a laser tracker 10 having an auxiliary unit 70. The auxiliary unit 70 supplies electrical power to the laser tracker 10 and in some cases also provides computing and clocking capability. In one embodiment, the separate auxiliary unit 70 is eliminated by moving the functionality of auxiliary unit 70 into the tracker base 16. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality is built into laser tracker 10. The connection between auxiliary unit 70 and computer 80 may be wireless, such as through Wi-Fi or Bluetooth communications, for example, or be wired through a cable of electrical wires, such as a serial, coaxial or Ethernet cable for example. Computer 80 may be connected to a network, and auxiliary unit 70 may also be connected to a network. In one embodiment, the application software is operated in a distributed computing environment. It should be appreciated that the computer 80 may be directly coupled to the auxiliary unit 70, or may be remote from the laser tracker 10 and connected via a local or wide area network. Plural instruments, such as multiple measurement instruments or actuators for example, may be connected together, either through computer 80 or auxiliary unit 70.

The laser tracker 10 may be rotated on its side, rotated upside down, or placed in an arbitrary orientation. In these situations, the terms azimuth axis and zenith axis have the same direction relative to the laser tracker as the directions shown in FIG. 1 regardless of the orientation of the laser tracker 10.

In another embodiment, the payload 15 is replaced by a mirror that rotates about the azimuth axis 20 and the zenith axis 18. A laser beam is directed upward and strikes the mirror, from which it launches toward a retroreflector 26. In still another embodiment, the payload 15 may be replaced by a two or more galvanometer mirrors that are rotated independently of each other to direct the laser beam to the desired location.

Figure 3:
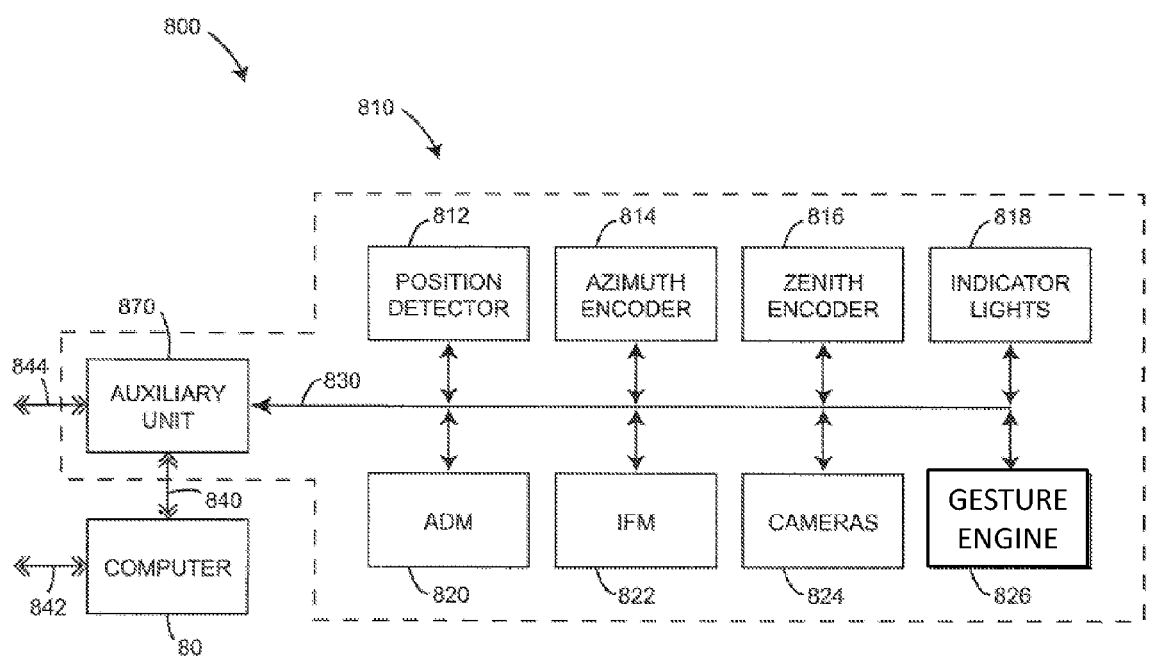
FIG. 3 is a block diagram an electronics processing system associated with the laser tracker of FIG. 1.

The methods for operating the laser tracker 10 discussed herein may be implemented by means of processing system 800 shown in FIG. 3. Processing system 800 comprises tracker processing unit 810 and optionally computer 80. Processing unit 810 includes at least one processor, which may be a microprocessor, digital signal processor (DSP), field programmable gate array (FPGA), or similar device. Processing capability is provided to process information and issue commands to internal tracker processors. Such processors may include position detector processor 812, azimuth encoder processor 814, zenith encoder processor 816, indicator lights processor 818, ADM processor 820, interferometer (IFM) processor 822, and camera processor 824. The processing unit 810 may further include a gesture recognition engine 826 to assist in evaluating or parsing of gestures patterns. Auxiliary unit processor 870 optionally provides timing and microprocessor support for other processors within tracker processor unit 810. It may communicate with other processors by means of device bus 830, which may transfer information throughout the tracker by means of data packets, as is well known in the art. Computing capability may be distributed throughout tracker processing unit 810, with DSPs and FPGAs performing intermediate calculations on data collected by tracker sensors. The results of these intermediate calculations are returned to auxiliary unit processor 870. As explained previously, auxiliary unit 70 may be attached to the main body of laser tracker 10 through a long cable, or it may be pulled within the main body of the laser tracker so that the tracker attaches directly (and optionally) to computer 80. Auxiliary unit 870 may be connected to computer 80 by connection 840, which may be an Ethernet cable or wireless connection, for example. Auxiliary unit 870 and computer 80 may be connected to the network through connections 842, 844, which may be Ethernet cables or wireless connections, for example.

Preprocessing of sensor data may be evaluated for gestures content by any of processors within the system 800, but there may also be a gesture recognition engine 826 specifically designated to carry out gestures preprocessing. Gestures engine 826 may include a microprocessor, DSP, FPGA, or similar device. It may contain a buffer that stores data to be evaluated for gestures content. Preprocessed data may be sent to auxiliary unit for final evaluation, or final evaluation of gestures content may be carried out by gestures preprocessor 826. Alternatively, raw or preprocessed data may be sent to computer 80 for analysis.

In one embodiment, the capture device 55 generates a 3D skeletal model of the operator that allows for the interpretation of movements and or body positions as commands to be executed by the laser tracker 10. The skeletal model may include information, such as the position of joints on the operator and locations of specific body portions. In one embodiment, the skeletal model identifies the location of the operator's hand, fingers and the connecting joints.

The gestures engine 826 may include a collection of gesture filters, each comprising information concerning a gesture that may be performed by the user as interpreted through the skeletal model. The data captured by camera 59 in the form of the skeletal model and movements of the skeletal model may be compared to the gesture filters in the gesture engine 826 to identify when an operator (as represented by the skeletal model) has performed one or more gestures. Those gestures may be associated with various controls of the laser tracker 10. Thus, the processing system 800 may use the gesture engine 826 to interpret movements of the skeletal model and control an application based on body (e.g. hand) position or movements.

The gesture filters may be modular or interchangeable. In one embodiment, the filter has a number of inputs, each having a type, and a number outputs, each having a type. Inputs to the filter may comprise items such as joint data about a user's joint position (e.g. angles formed by the bones that meet at the joint), RGB color data, and the rate of change of an aspect of the user. Outputs from the filter may include parameters such as a confidence level that a particular gesture has been made and the speed of motion of the gesture. Filters may further include contextual parameters that allow for the recognition of particular gestures in response to previous actions.

Although embodiments that use of gestures to control the measurement of an object describe the operation in connection with a single laser tracker, this is for exemplary purposes and the claimed invention should not be so limited. In other embodiments, gestures may be used with collections of laser trackers or with laser trackers combined with other instruments. One possibility is to designate one laser tracker as the master that then sends commands to other instruments. For example, a set of four laser trackers might be used in a multilateration measurement in which three-dimensional coordinates are calculated using only the distances measured by each tracker. Commands could be given to a single tracker, which would relay commands to the other trackers. Another possibility is to allow multiple instruments to respond to gestures. For example, suppose that a laser tracker were used to relocate an articulated arm CMM. An example of such a system is given in U.S. Pat. No. 7,804,602 to Raab, which is incorporated by reference herein. In this case, the laser tracker might be designated as the master in the relocation procedure. The operator would give gestural commands to the tracker, which would in turn send appropriate commands to the articulated arm CMM.

Figure 4:
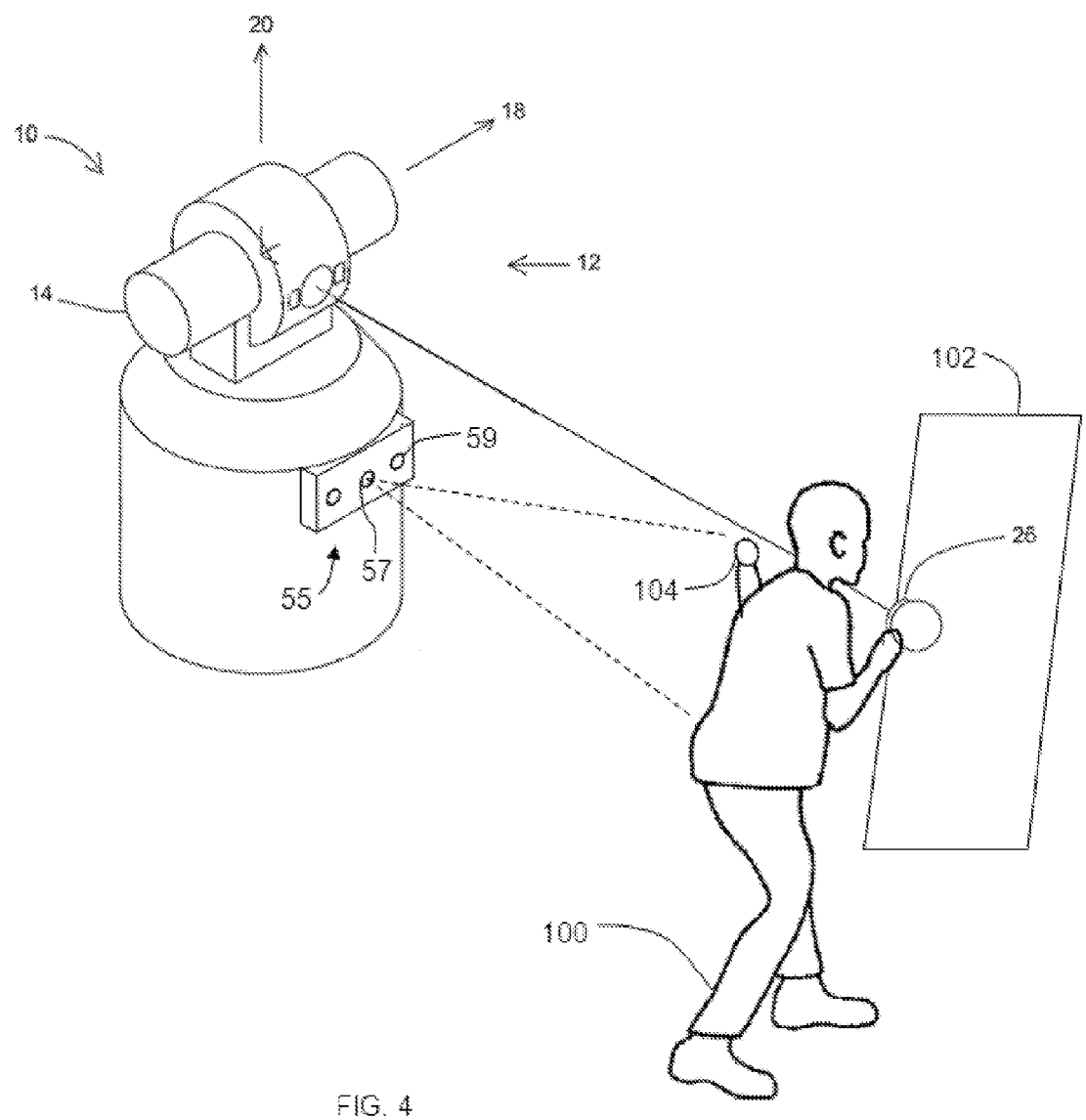
FIG. 4 is a perspective view of the laser tracker of FIG. 1 with the operator using gestures to control operation.
Figure 5:
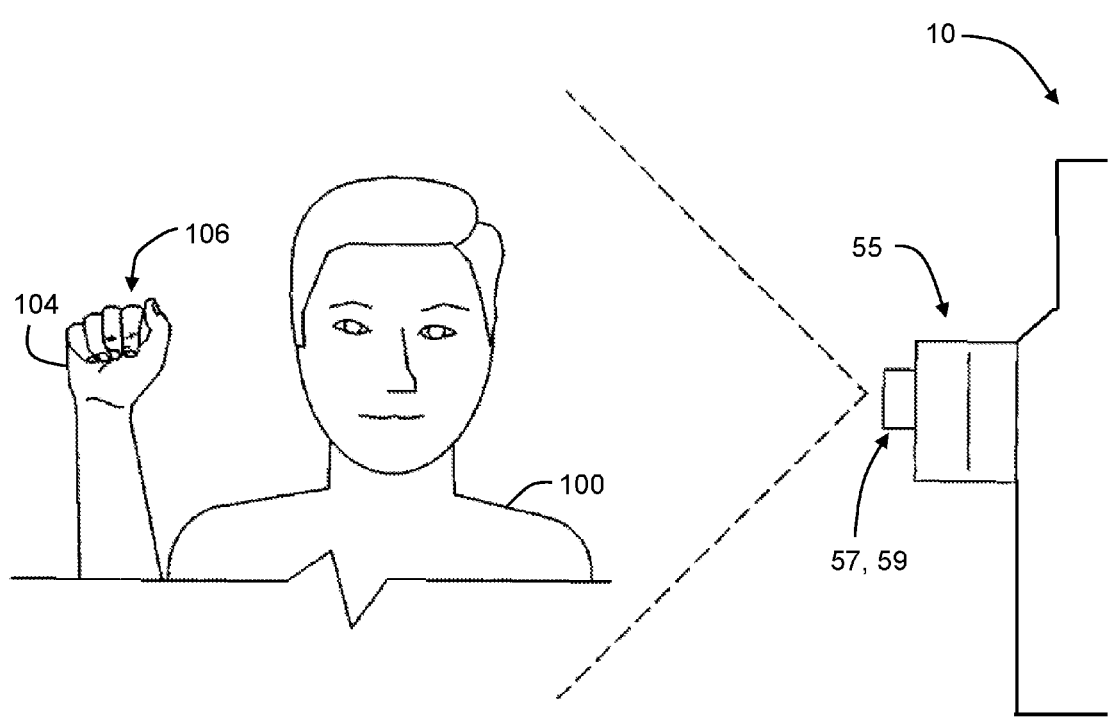
FIG. 5 is an illustration of the operator making a gesture to record a measurement.

Referring now to FIGS. 4-5, an example is shown of the operator 100 making a gesture with a hand to acquire a measurement during the operation of the laser tracker 10. The operator 100 first places the retroreflector 26 in a location where a measurement is desired, such as on object 102 for example. With the retroreflector 26 in the desired location, the operator 100 raises his hand 104 and makes a predefined hand gesture 106, such as a closed fist for example. As the operator 100 moves, images of the operator 100 are acquired by the camera 59 of capture device 55. The projector 57 emits a light pattern onto the operator 100 which allows the capture device 55 to determine coordinates of points on the operator 100. From these coordinates, a skeletal model of the operator 100 is generated. In one embodiment, a portion of the operator, such as a hand is identified and tracked. When the operator 100 makes a gesture, such as holding up a closed fist for example, in view of the camera 59, the image is acquired and compared with predetermined gestures with the gesture engine 826. In one embodiment, this comparison is performed using filters as described herein above. Once the gesture is determined by the gesture engine 826, the processing system 800 initiates one or more actions in response. For example, when the operator 100 holds up a closed fist, the laser tracker may measure and record the three-dimensional coordinates of the retroreflector 26. The tracker may respond in a variety of ways, some not involving a retroreflector. For example, the tracker may respond by starting a measurement sequence in which a laser beam is directed to the first of a sequence of points that are to be measured sequentially. As another example, the tracker may respond by carry out an initialization procedure. As a third example, the tracker might use the cameras 52 and LEDs 54 to illuminate a collection of retroreflectors, and then measure the three-dimensional coordinates of each in turn.

Figure 6:
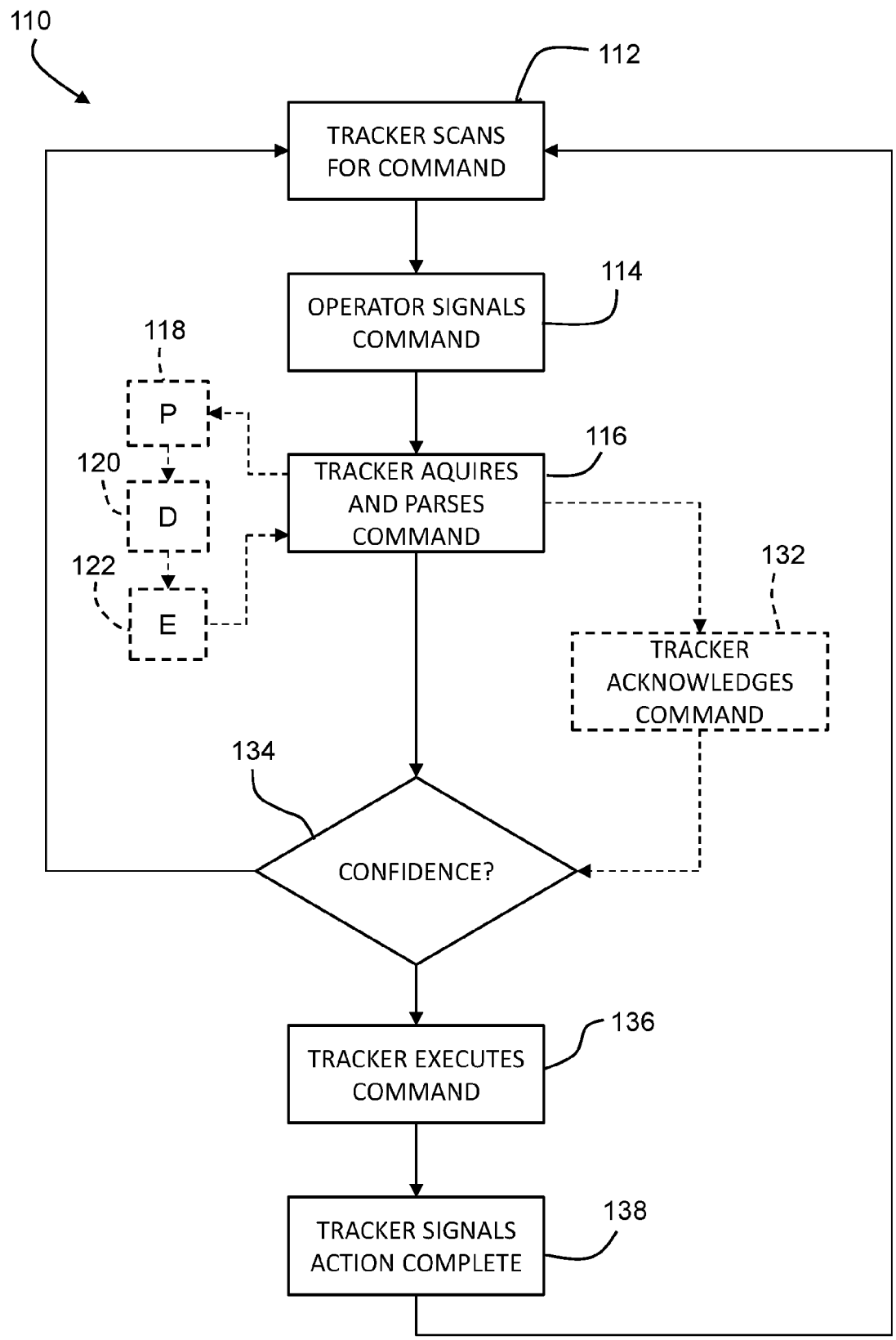
FIG. 6 is a flow diagram illustrating an operation of the laser tracker with a gesture.

Referring now to FIG. 6, a method 110 is shown for acquiring and executing a command on a laser tracker 10 using a gesture. In block 112, the method 110 starts by scanning for a gesture using the capture device 55. The method 110 then proceeds to block 114 where the operator makes the gesture. The gesture is acquired by capture device 55 and parsed by gesture engine 826 in block 116. In one embodiment, the operator may make three signals, a first gesture in block 118 to indicate a command gesture is forthcoming, a second gesture in block 120 that indicates the content of the command, and a third gesture in block 122 that indicates the gestures are command gestures are complete. The use of a prologue gesture 118 and an epilogue gesture 122 may provide advantages in situations where there is a risk of the operator making a command gesture unintentionally.

FIGS. 7-9 illustrate two sets of gestures 124, 126. Each of the gestures 124, 126 is associated with a corresponding command 128 in the laser tracker 10. In an exemplary case, laser tracker commands include measuring a comp off point, measuring a comp axis point, measuring a plane, measuring a 2D line, measuring a circle, measuring a cylinder, measuring a sphere, changing an SMR, resetting an interferometer, setting a distance mode, searching for a target, toggling between single point mode and scan mode, collecting a reading, moving to a home position, removing a reading, autoadjusting an ADM using an SMR, autoadjusting an ADM using an internal retroreflector, initializing a command tablet, setting an SMR, and acquiring an SMR.

In one embodiment, the laser tracker 10 may include a user input device, such as a keyboard for example, that allows for a short-cut sequence of keystrokes 130 to execute the command. The first set of gestures 124 corresponds to a motion gesture, such as where the operator holds up a hand and moves the hand in a prescribed pattern. The pattern may be in two or three dimensions. For each of the first set of gestures 124, the starting position is indicated with a small circle and the ending position is indicated with an arrow. The second set of gestures 126 corresponds to a static gesture wherein the operator makes a predetermined pose with a portion of their body, such as a hand gesture. It should be appreciated that the gestures may be combined together to form a compound gesture that indicates to the laser tracker 10 a series of commands to be performed. Further, it should be appreciated that the gestures shown in FIGS. 7-9 are exemplary and the claimed invention should not be so limited.

Once the capture device 55 acquires the image of the gesture and parses the command gesture, the method 110 may optionally acknowledge receipt of the command in block 132. In one embodiment, simultaneous with acknowledging receipt of the command, the method 110 may proceed to query block 134 where a confidence level in the acquired gesture is determined. The confidence level corresponds to the likelihood that the operator's movement or pose corresponds with the gesture. The confidence level may be scalable, such as from 0 to 1 for example. When the confidence level is below a predetermined threshold, such as 95% or 0.95 for example, the method loops back to block 112 and the process is restarted. If the confidence level is above the predetermine threshold, then the method 110 proceeds to block 136 where the laser tracker 10 executes the command indicated by the acquired gesture and then actuates an action complete indicator to alert the operator the command has been completed.

Figure 10:
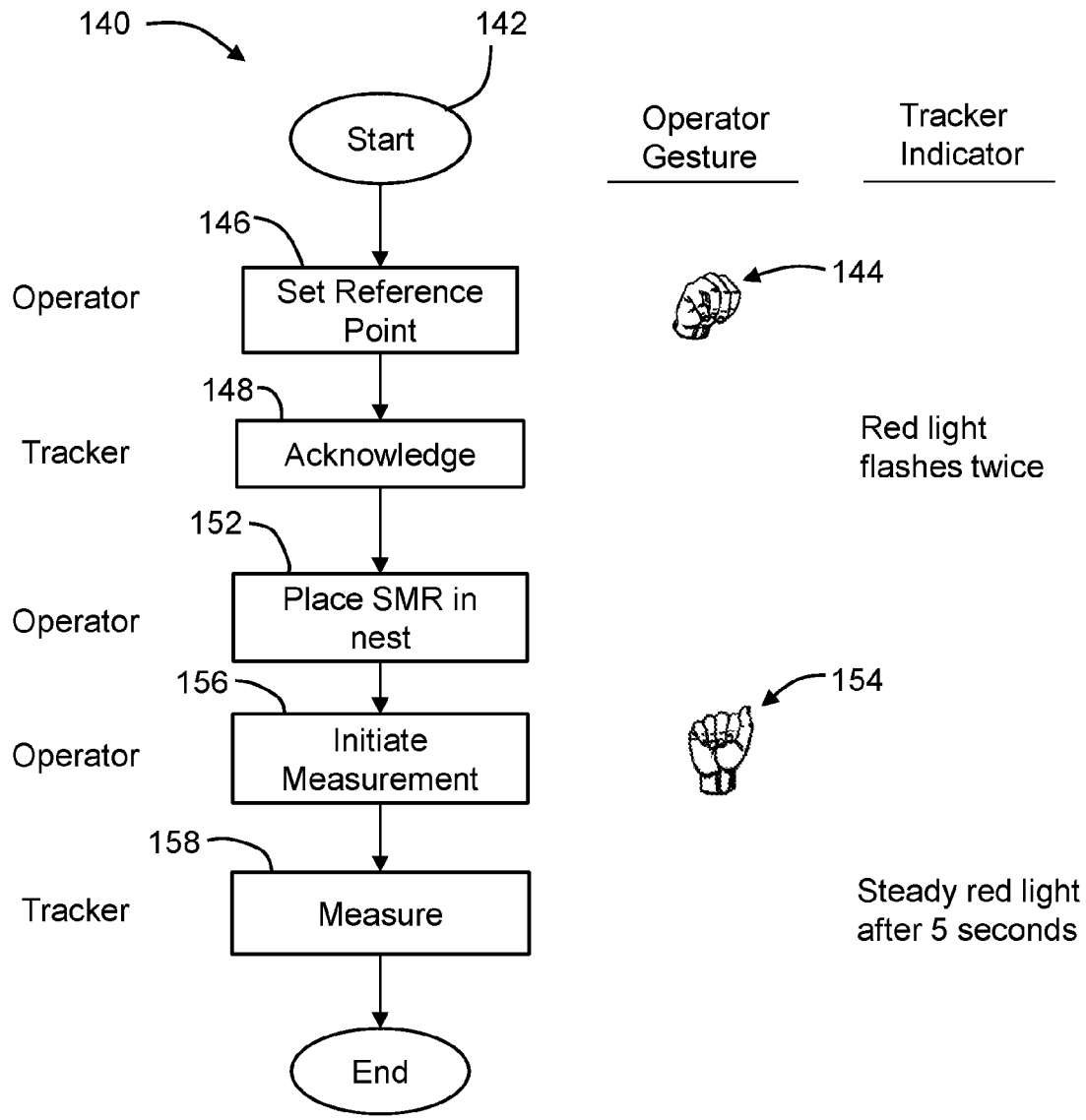
FIG. 10 is a flow diagram illustrating the use of gestures to set a tracker reference point.
Figure 11:
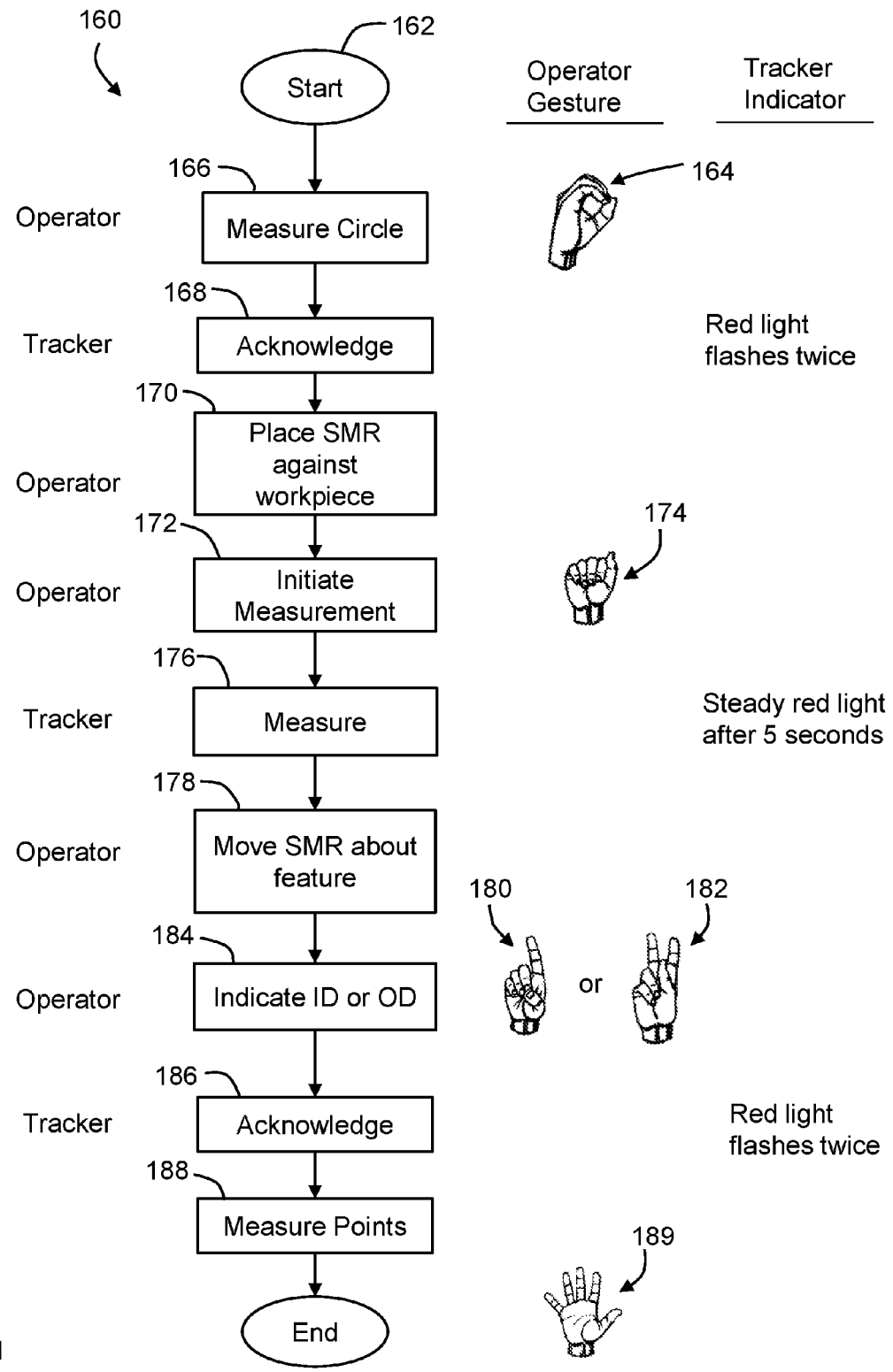
FIG. 11 is a flow diagram illustrating the use of gestures to measure a circle.
Figure 12:
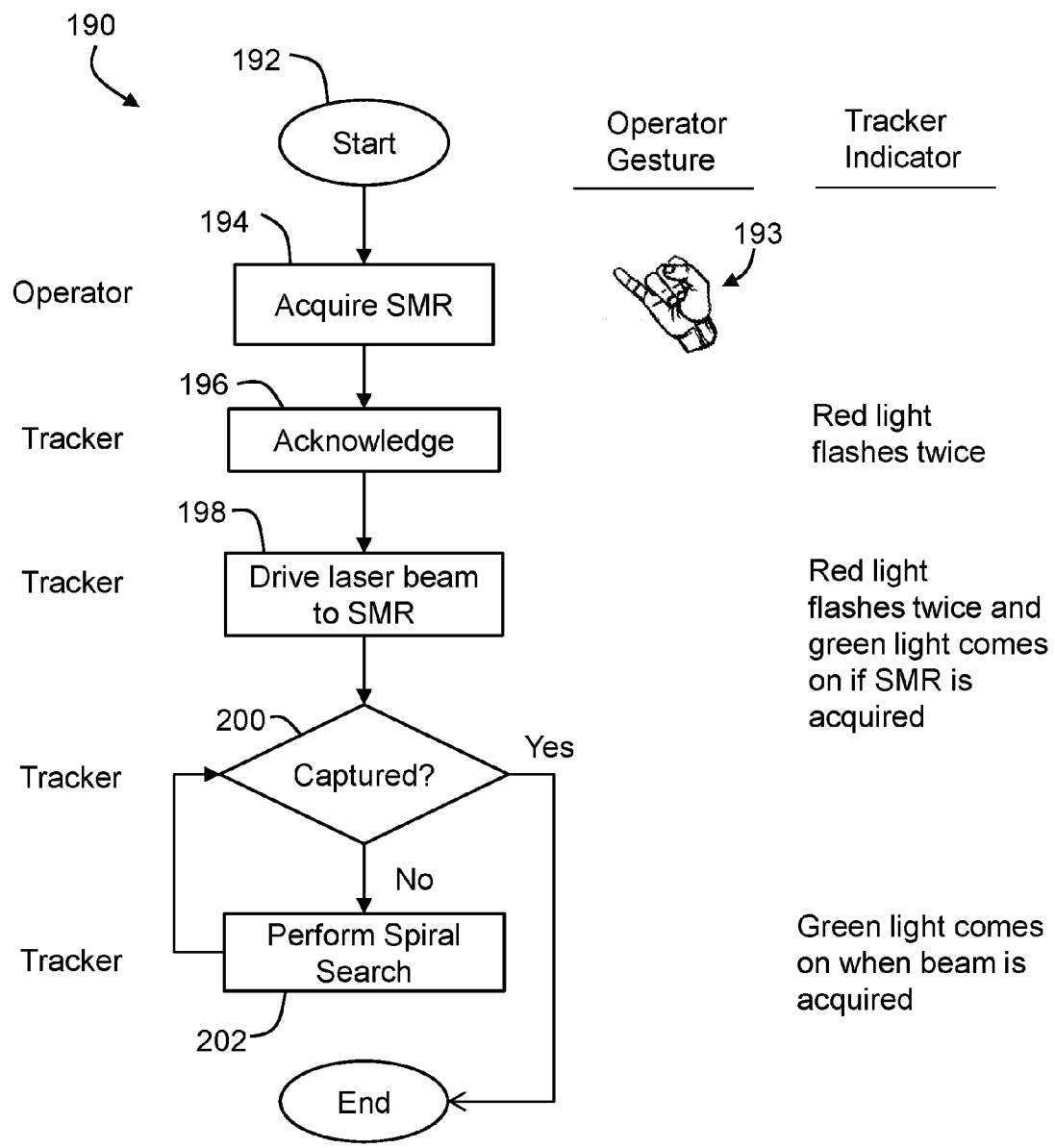
FIG. 12 is a flow diagram illustrating the use of gestures to acquire a retroreflector with a laser beam from a laser tracker.

Referring now to FIGS. 10-12, exemplary embodiments are shown of operating the laser tracker 10 with gestures. In FIG. 10, the method 140 starts in block 142 and acquires a gesture 144, which in this example corresponds to the command "Set Reference Point" in block 146. The method 140 proceeds to block 148 where the laser tracker 10 acknowledges the command by flashing a colored light, such as a red light emitting diode (LED) 149 for example, twice. A common reference position is the home position of the laser tracker 10, which corresponds to the position of a magnetic nest 150 permanently mounted on the body 16 of the laser tracker 10. Another reference point that is located close to the work volume may be chosen to avoid having the operator to walk back to the laser tracker 10 when connection the laser beam 46 to the retroreflector 26 is interrupted. The operator then proceeds to place the retroreflector 26 at the reference location (e.g. nest 150) in block 152. With the retroreflector 26 in the reference location, the operator makes a gesture 154, which initiates the measurement in block 156. The laser tracker 10 then makes a measurement to set a reference point in block 158. In one embodiment, when the laser tracker 10 makes a measurement, the colored light or LED 149 is activated for a predetermined amount of time, such as five seconds for example.

In FIG. 11, a method 160 is shown for measuring a diameter of a feature on an object. The method 160 starts in block 162 and the operator gestures 164 to measure a circle in block 166. The laser tracker 10 acknowledges the command in block 168, such as by flashing the LED 149 twice. The operator then proceeds to place the retroreflector 26 against the object in block 170 and initiates a measurement in block 172 by making a gesture 174. For example, if the operator is measuring the inside of a circular hole, the SMR will be placed against a surface on the inside of the hole. The laser tracker 10 measures the coordinates of the point where the retroreflector is located in block 176 and indicates the measurement to the operator by activating the LED 149 for five seconds. The operator then moves the retroreflector 26 about feature in block 178 and makes a gesture 180 to measure an inner diameter or gesture 182 to measure an outer diameter in block 184 to remove an offset distance to account for the radius of retroreflector 26. The laser tracker 10 then acknowledges receipt of the command in block 186. The operator then moves the retroreflector 26 about the feature in block 188. When enough points have been collected, the operator moves the retroreflector 26 away from the surface of the object.

In FIG. 12, a method 190 is shown for acquiring the retroreflector 26 with the laser tracker 10. The method 190 starts in block 192 and proceeds to block 194 where the operator gestures 193 to indicate that retroreflector should be acquired. The laser tracker 10 acknowledges receipt of the gesture in block 196 such as by flashing the LED 149 twice. The laser tracker 10 then proceeds in block 198 to drive or steer the laser beam 46 toward the retroreflector 26. In one embodiment, the LED 149 flashes twice and then turns green when the retroreflector is acquired. The method 190 then proceeds to query block 200 where it is determined whether the laser beam 46 has been directed onto the retroreflector 26. If query block 200 returns an affirmative, meaning that the position of the retroreflector 26 has been captured, then the laser tracker 10 indicates this by changing the LED 149 to green. If the query block 200 returns a negative then the method 190 proceeds to block 202 where a search pattern is performed, such as a spiral search pattern. The search pattern is performed until the retroreflector 26 is acquired by the laser tracker 10. It should be appreciated that in some embodiments, the laser tracker 10 may use camera's 52 to locate the general area of the retroreflector 26 to reduce the time to acquire the retroreflector 26.

Figure 13:
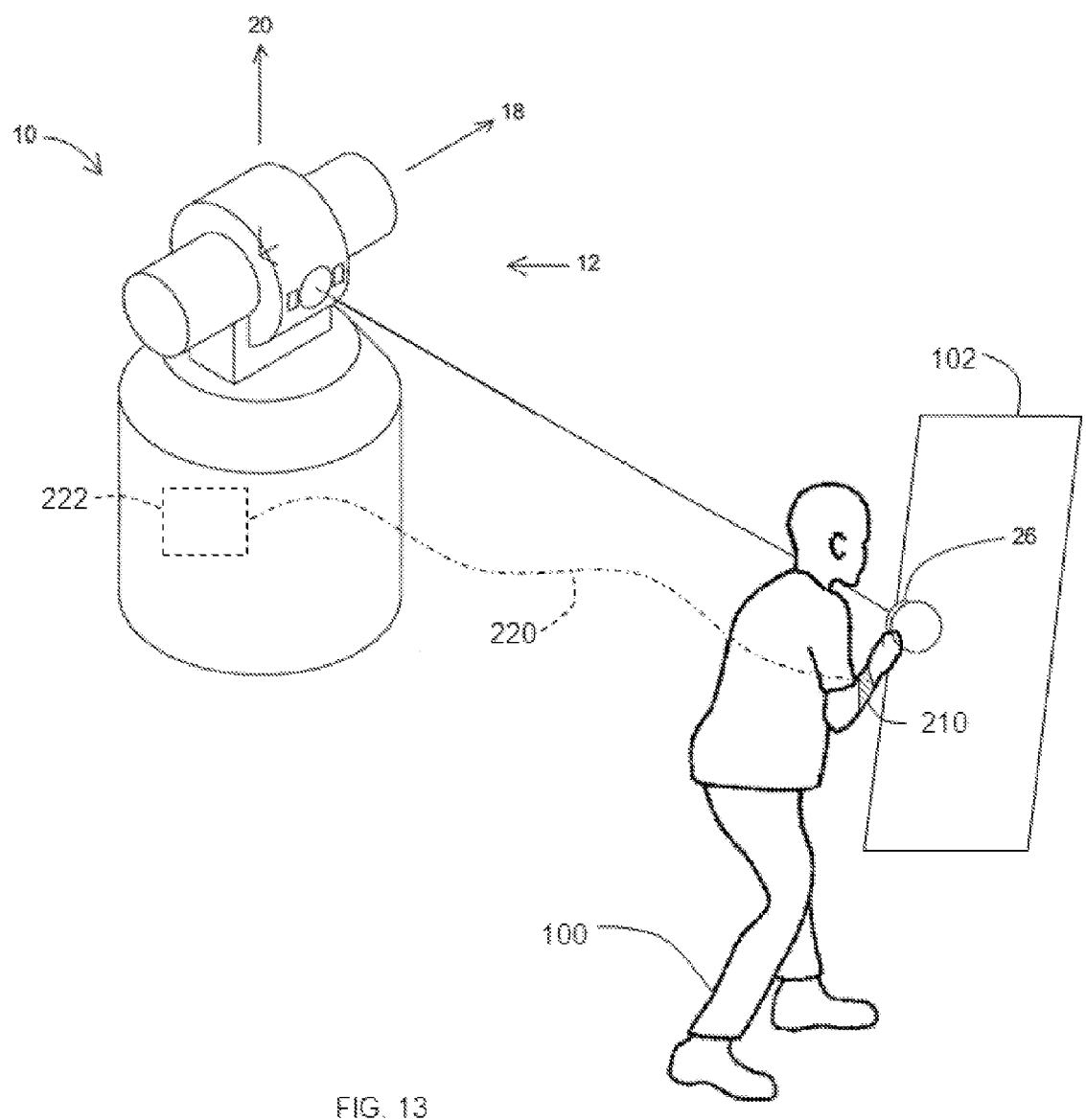
FIG. 13 is a perspective view of a laser tracker in accordance with another embodiment of the invention.
Figure 14:
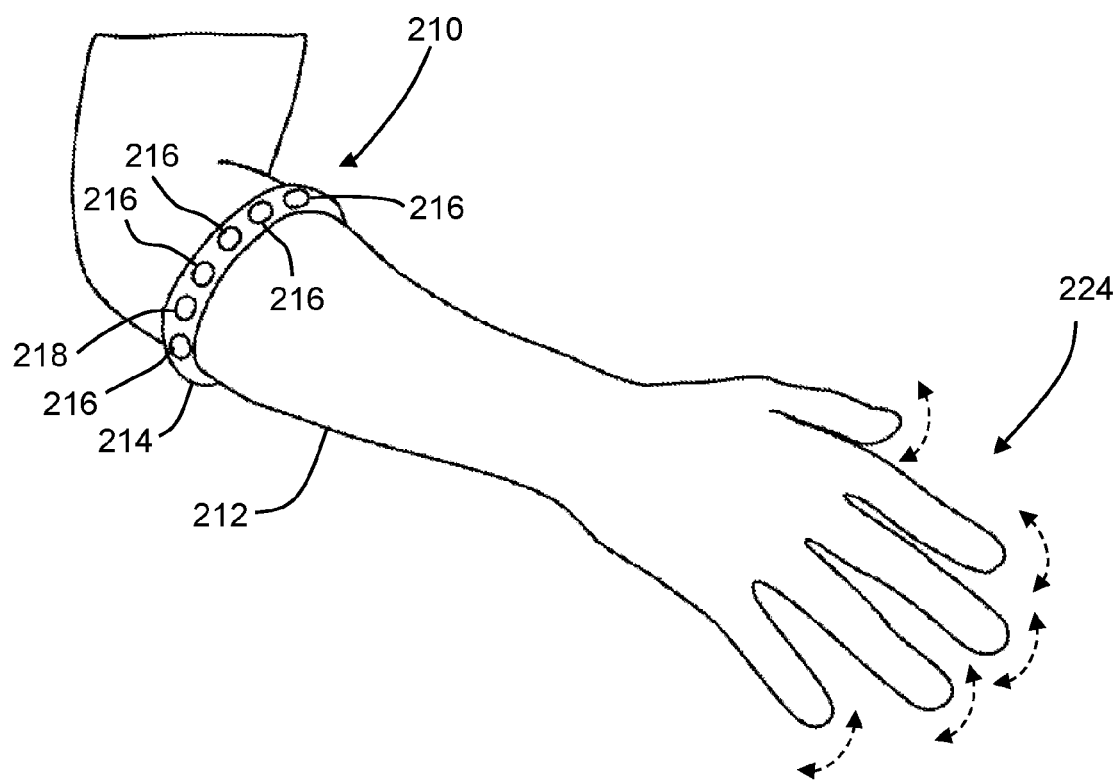
FIG. 14 is a perspective view of the operator's arm with a wearable gesture device for use with the laser tracker of FIG. 13.

Referring now to FIGS. 13 and 14 another embodiment of a laser tracker 12 is shown for use with a gesture device 210. The gesture device 210 may be any device or devices implemented in various form factors, which is either worn by the operator 100 or temporarily attached to the operator's body, such as a sleeve that is worn on the operator's forearm 212 for example. The gesture device 210 provides a human computer interface (HCI) that allows the operator to control and interact with the laser tracker 12 via electrical signals generated by the movement of the user's muscles.

In one embodiment, the gesture device 210 includes a body 214 made from an elastic material that allows the gesture device 210 to fit tightly, but comfortably, about the operator's forearm 212. A plurality of sensors 216 are coupled to the body 214 adjacent the operator's skin. In one embodiment, the sensors 216 are electromyography (EMG) sensor nodes. The EMG sensors 216 detect an operator's muscle generating electrical signals produced by the operator's body in response to movement, such as when the operator moves an arm 212 or fingers 224 for example. The gesture device 210 measures the electrical voltage potential and determines the movement or position of the operator based on the muscles that are activated and the level of the electrical signal. Thus, if the operator makes a hand gesture, such as making a closed fist for example, the gesture device 210 can determine the gesture being made. It should be appreciated that in some embodiments, the operator may calibrate the gesture device 210 to associate desired muscles with the sensors 216.

In the exemplary embodiment, the gesture device 210 includes a transmitter 218 that transmits a signal 220 to a receiver 222 in the laser tracker 12. The transmission of the signal 220 may be performed by a suitable wireless medium, such as Bluetooth, Wi-Fi (IEEE 802.11 standard) for example. In another embodiment, the gesture device 210 is coupled to the laser tracker 12 by a wired medium, such as a Universal Serial Bus (USB) connection for example. The gesture device 210 will also include a power source, such as batteries for example, that provide the energy to operate the gesture device 210. In one embodiment, the determination of the gesture made by the operator 100 is performed in the gesture device 210. It should be appreciated that where the gesture determination is performed in the gesture device 210, the gesture device 210 may include a controller (not shown) having a processor. In another embodiment, the voltage potential data is transmitted to the receiver 222 and the gesture determination is performed in the laser tracker 12.

During operation, the operator slides the gesture device 210 onto his forearm 212 and aligns or calibrates the gesture device 210 if necessary. It should be appreciated that the gesture device 210 may be placed on either arm of the operator or that a differently shaped gesture device may be placed elsewhere on the body, such as a finger for example. The operator then proceeds to give the desired command. In one embodiment, the operator makes hand gestures, such as those shown in FIGS. 7-9 in the process of performing measurements with a laser tracker 10. It should be appreciated that the gesture device 210 provides advantages in that the operator's arm or hand does not need to be within a line of sight of the laser tracker 12 to transmit commands and perform operations with the laser tracker 12.

Figure 15:
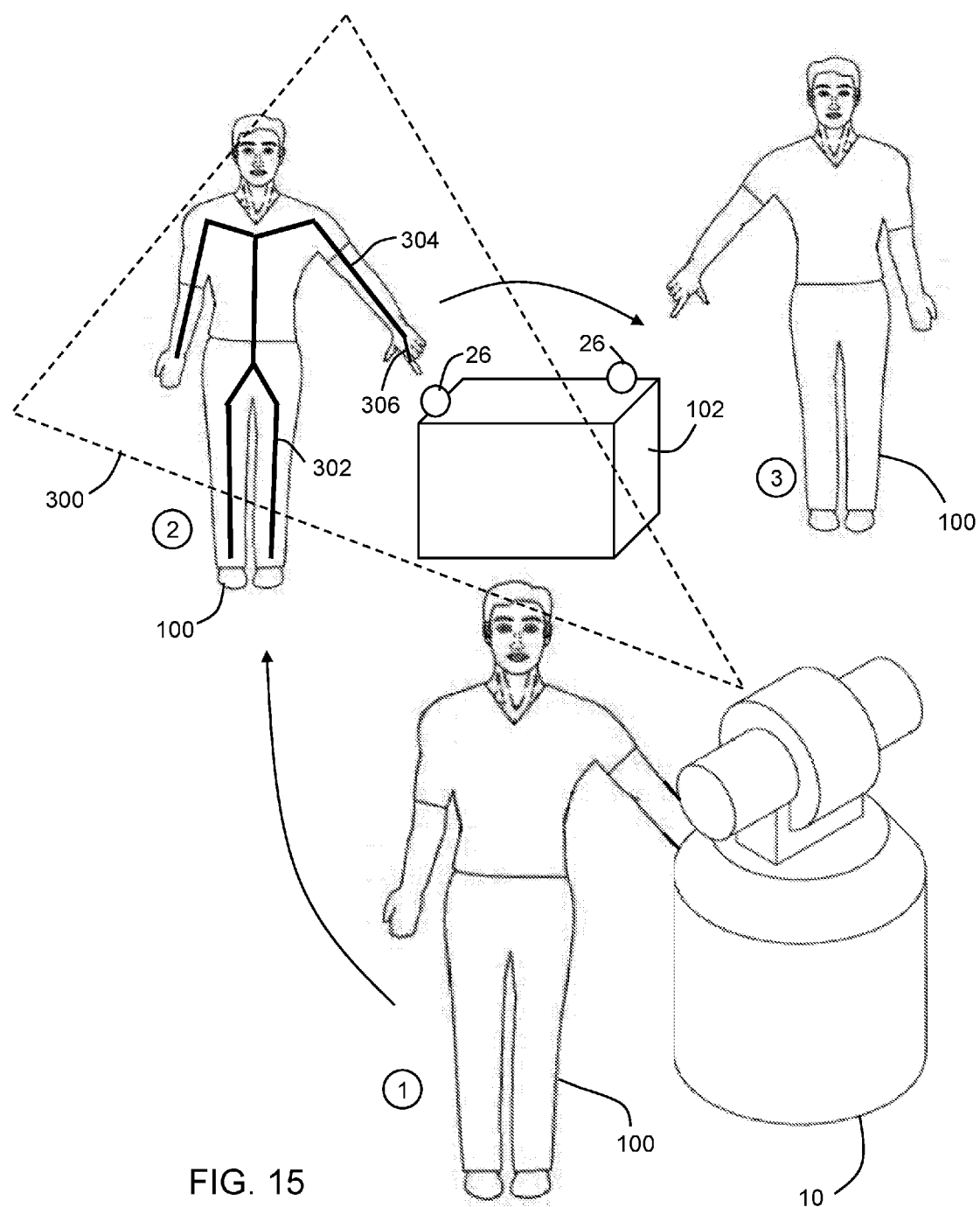
FIG. 15 is an illustration of the tracking of a user and the use of gestures in conveying commands to a laser tracker.
Figure 16:
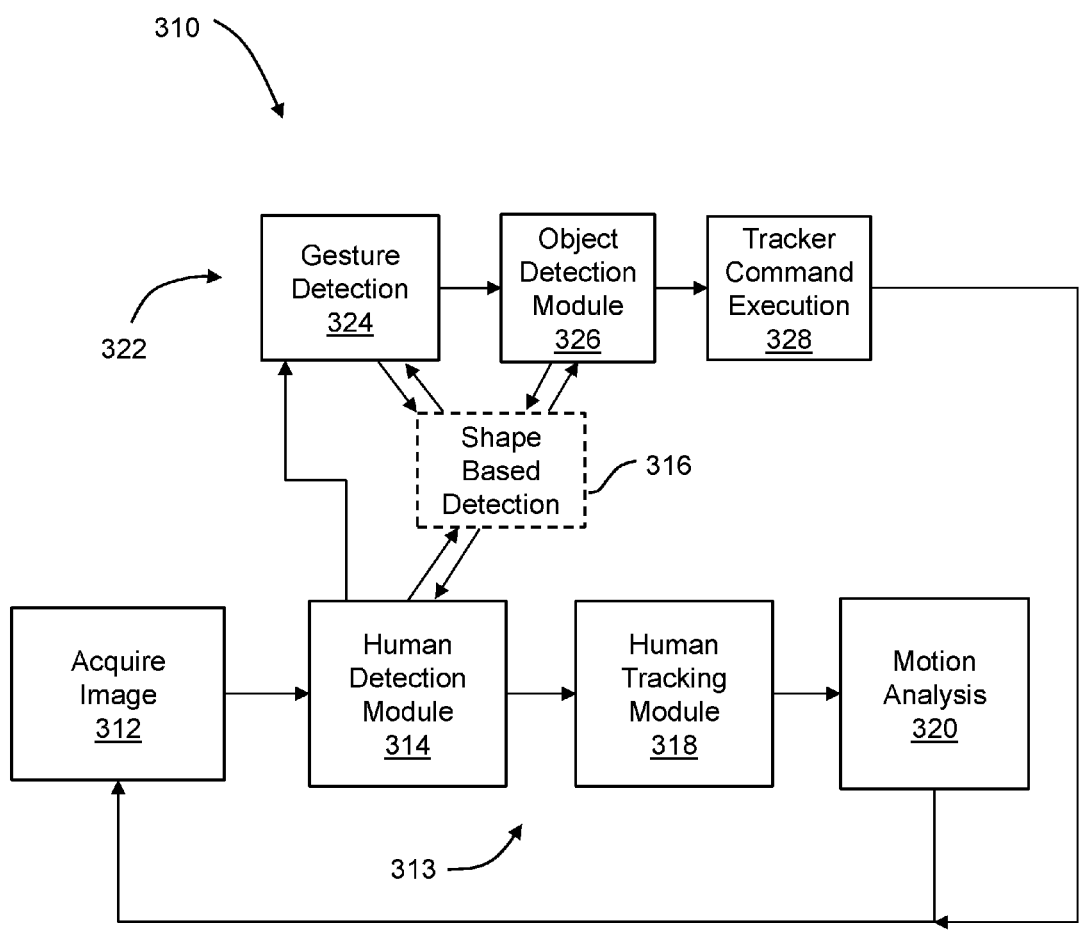
FIG. 16 is a flow diagram illustrating the tracking of the user and the use of gestures to convey commands to a laser tracker.

Referring now to FIGS. 15-16, another embodiment is shown of using gestures for conveying commands to a laser tracker. In this embodiment, the laser tracker 10 includes a camera, such as camera 59 (FIG. 1A) for example. The camera 59 has a field of view 300 that defines that volume of space in which images may be acquired. In embodiments where the camera 59 is attached to the payload 15, the field of view 300 will move as the payload is rotated about the axis 18, 20. It should be appreciated that in some embodiments, the camera 59 is separate from the laser tracker 10 and may be arranged to provide a field of view that includes the areas where measurements are to be performed.

As the operator moves within the field of view 300, the camera 59 may track the movement of the operator and distinguish the operator from background objects, or other moving objects (e.g. forklifts) within the acquire image. In one embodiment, a skeletal model 302 is fit to the operator to facilitate tracking of the user. The skeletal model 302 may include a first body part 304 (e.g. an arm or torso) and a second body part 306 (e.g. a finger). In this way, a gesture, such as pointing at an object (e.g. a retroreflector) may be detected from the images acquired by the camera 59. This provides advantages in allowing a single operator to make measurements using multiple retroreflectors. In one embodiment, the laser tracker 10 determines which retroreflector 26 the operator 100 desires to measure by identifying an object that the operator 100 is pointing at is a retroreflector. The laser tracker 10 may then automatically orient the payload 14 such that the light source 54 (FIG. 1A) directs the light onto the retroreflector. Thus the laser tracker 10 may determine the three-dimensional coordinates of a point on the object 102 based at least in part on angular measurements by the encoders and the time it takes for the beam of light to travel to the retroreflector 26 and back to the laser tracker 10.

Referring now to FIG. 16 a method 310 is shown for tracking an operator and conveying commands to a laser tracker. The method 310 starts in block 312 where an image is acquired, such as by camera 59 for example. The method 310 then proceeds to block 314 where a human detection module determines if the operator is within the acquired image. The human detection module 314 may invoke a detection method, such as a shape based detection module 316. In one embodiment, the shape based detection module 316 includes a stabilization engine that aligns the current image frame with a proceeding image frame. The foreground region may then be determined at least in part by subtracting the images. In one embodiment, the subtraction is performed in the hue channel of hue, saturation and value (HSV) color space. Objects and people within the foreground may be identified by the shape based detection module 316 by comparing edges within the image to a database of templates of shapes, such as human silhouettes for example.

If an operator is detected, the method 310 may bifurcate into two parallel processes. In the first path 313, the operator is tracked in tracking module 318. This module tracks the position of the operator through successive image frames, this may be done for example by modeling the pixel intensities over time. The method 310 also uses a motion analysis module 320 to verify that the tracked object is human. The motion analysis may be performed by performing a periodicity test on the pixels within a bounded box of the operator being tracked. If the number of periodic pixels is higher than a threshold, then the tracked operator is determined to be human and not a moving object, such as a forklift for example. The human detection, tracking and motion analysis processes may be similar to those described in the article "Real-Time Human Detection in Uncontrolled Camera Motion Environments" by Hussein et al, Institute for Advanced Computer Studies, University of Maryland (http://www.umiacs.umd.edu/~wamageed/papers/icvs2006.pdf, accessed Apr. 25, 2014), the contents of which is incorporated herein by reference.

It should be appreciated that while the human detection module 314, the human tracking module 318 and the motion analysis module 320 are illustrated as being performed serially, this is for exemplary purposes and the claimed invention should not be so limited. In other embodiments the modules 314, 318, 320 may run in parallel or partially in parallel.

On the second path 322, the method 310 proceeds to block 324 where a gesture detection module 324 determines if the detected operator has made a gesture. As discussed above, in one embodiment the gesture detection is performed to detect a human pose, such as by fitting a skeletal model 302 to the operator for example. In one embodiment, the laser tracker 10 may further include a projector that emits a structured light towards the operator. As discussed herein above, the structured light is received by the camera and a three dimensional coordinates of the operator may be determined. In this manner, the portions of the operators body (e.g. arm, hand, torso, legs) may be determined along with joints (e.g. shoulder, elbow, wrist). In another embodiment, the skeletal model 302 is applied by comparing the edge of the detected operator to a database of human silhouettes. The gestures that may be performed include, but are not limited to, pointing at a retroreflector, pointing to reacquire a retroreflector after a beam break for example. The gesture detection module 324 may detect the gesture using shape-based detection module 316.

If a gesture has been detected, the method 310 proceeds to block 326 where an object detection module detects one or more objects depending on the gesture. For example, if the gesture is the operator pointing, the object detection module determines if there are any objects along a vector defined by the operators arm or finger. For example, when the gesture is a pointing finger, the object detection module may determine whether a retroreflector is located in an area along the vector defined by the pointing finger. In one embodiment, the detection of the object may be determined based on the shape-based detection module 316. It should be appreciated that this detection may also be context sensitive. Where a laser tracker 10 has been tracking retroreflector and the beam has been broken, the pointing of the finger may indicate that the laser tracker 10 is to require the retroreflector that the operator is pointing to. In other embodiments, the gesture may indicate other objects, such as the object to be measured. Once the object has been detected, the method 310 proceeds to block 328 where the laser tracker command is executed, such as measuring the distance to the retroreflector, reacquire and track the retroreflector, or perform a series of predetermined measurements on an object for example.

Although the gesture devices described hereinabove are directed in exemplary embodiments to use with a laser tracker, it should be understood that such a gesture tracking device may be used with another type of three-dimensional measurement device such as a laser tracker, a triangulation type scanner, a time-of-flight type scanner, a photogrammetry system, or a Cartesian coordinate measurement machine (CMM), for example.

Technical effects and benefits of embodiments of the present invention include the visual conveying of commands from an operator to a metrology instrument, such as a laser tracker for example. The conveying of commands allows for an operator to initiate actions and operations on the metrology instrument at a distance with no physical or radio/wireless connection.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for a user to control operation of a measurement device, the method comprising:
   providing a relationship between each of a plurality of commands and each of a plurality of gestures, each gesture of the plurality of gestures corresponding to a body position of the user;
   providing the measurement device, the measurement device measuring three-dimensional coordinates of a point based at least in part on light from a first light projected from a first light source of the measurement device;
   providing a processor operably coupled to the measurement device;
   projecting a second light beam from a second light source and acquiring a first image of a user;
   generating with the processor a skeletal model of the user from the first image;
   positioning the user into a first body position, the first body position corresponding to a first gesture from among the plurality of gestures;
   identifying with the processor from the skeletal model the performing by the user of the first gesture;
   determining a first command with the processor based at least in part on the identifying of the first gesture;
   executing the first command with the measurement device;
   positioning the user into a second body position, the second body position corresponding to a second gesture corresponding to a second body position;
   identifying with the processor from the skeletal model the performing by the user of the second gesture;
   determining with the processor the second command based at least in part on identifying the second gesture; and
   executing the second command with the measurement device.

2. The method of claim 1 wherein the first command is to acquire a retroreflector.

3. The method of claim 1 wherein the second light beam includes a structured light pattern, and the image includes at least a portion of the structured light pattern.

4. The method of claim 1 wherein the generating the skeletal model includes determining with the processor three dimensional coordinates of the user's body.

5. The method of claim 1 further comprising:
   providing a plurality of gesture filters, each gesture filter including information of a gesture performed by the user as interpreted through the skeletal model,
   wherein the identifying of the first gesture is based at least in part on one of the plurality of gesture filters.

6. The method of claim 5 wherein each of the plurality of gesture filters include a plurality of inputs and a plurality of outputs.

7. The method of claim 6 wherein the plurality of inputs includes at least one of joint data, RGB color data and a rate of change of an aspect of the user.

8. The method of claim 6 wherein the plurality of outputs includes at least one of confidence level and a speed of motion of the gesture.

9. A method of claim 1 wherein the second command further comprises:
   identifying with the processor an area containing the retroreflector from the second image; and
   reorienting the measurement device to acquire the retroreflector based at least in part on the identifying of the area.

10. A method of claim 1 wherein the first command is to acquire a retroreflector by performing with the measurement device a spiral search pattern to acquire the retroreflector.

11. The method of claim 10 wherein the first body position includes a pointing of a finger by the user at an object.

12. The method of claim 11, further comprising
   identifying with the processor based at least in part on the skeletal model the object in the first image the user is pointing at; and
   repositioning the measurement device to project the first light beam toward the object.

13. The method of claim 12, wherein the object is a first retroreflector.

14. The method of claim 13 further comprising a plurality of retroreflectors, wherein the plurality of retroreflectors includes the first retroreflector.

15. The method of claim 12, further comprising:
   identifying with the processor based at least in part on the skeletal model a point on the object the user is pointing at; and
   determining with the processor three-dimensional coordinates of the point.

16. The method of claim 1, further comprising:
   determining with the processor that the user is in the first image;
   acquiring with the camera a second image;
   aligning with the processor the second image with the first image; and
   identifying with the processor foreground shapes.

17. The method of claim 16, wherein at least one of the foreground shapes is the user.

18. The method of claim 17, further comprising subtracting with the processor the first image from the second image to identify foreground shapes.

19. The method of claim 18, further comprising tracking with the processor a movement of the user from the first image to the second image.

* * * * *